US007890395B2

(12) United States Patent
Phelan

(10) Patent No.: US 7,890,395 B2
(45) Date of Patent: Feb. 15, 2011

(54) METHOD AND SYSTEM FOR PROCESSING TAX PERTAINING TO A GOODS AND SERVICES TRANSACTION

(75) Inventor: William P. Phelan, Loudonville, NY (US)

(73) Assignee: Turnberry Partners, LP, Loudonville, NY (US)

( * ) Notice: Subject to any disclaimer, the term of this patent is extended or adjusted under 35 U.S.C. 154(b) by 1642 days.

(21) Appl. No.: 11/133,118

(22) Filed: May 19, 2005

(65) Prior Publication Data

US 2005/0261995 A1  Nov. 24, 2005

Related U.S. Application Data

(60) Provisional application No. 60/572,632, filed on May 19, 2004.

(51) Int. Cl.
*G06Q 40/10* (2006.01)
(52) U.S. Cl. ....................................................... 705/35
(58) Field of Classification Search ................... 705/35
See application file for complete search history.

(56) References Cited

U.S. PATENT DOCUMENTS

| 4,996,104 | A | 2/1991 | Nicholas et al. |
| 5,644,724 | A | 7/1997 | Cretzler |
| 6,016,479 | A | 1/2000 | Taricani, Jr. |
| 6,078,899 | A | 6/2000 | Francisco et al. |
| 6,347,304 | B1 | 2/2002 | Taricani, Jr. |
| 7,157,048 | B2 | 1/2007 | Goldsmith et al. |
| 7,319,982 | B1* | 1/2008 | Ryan et al. ............. 705/31 |
| 2002/0056756 | A1 | 5/2002 | Cameron et al. |
| 2003/0093320 | A1* | 5/2003 | Sullivan ................. 705/19 |
| 2003/0097303 | A1 | 5/2003 | Agee et al. |
| 2003/0105688 | A1 | 6/2003 | Brown et al. |
| 2004/0002906 | A1 | 1/2004 | VonDrehnen et al. |
| 2004/0181470 | A1* | 9/2004 | Grounds ................. 705/31 |
| 2004/0210834 | A1* | 10/2004 | Duncan et al. ........... 715/513 |
| 2004/0230525 | A1* | 11/2004 | Barsade et al. ........... 705/40 |
| 2005/0139686 | A1 | 6/2005 | Helmer et al. |
| 2006/0032427 | A1 | 2/2006 | Ishii et al. |

OTHER PUBLICATIONS

Robert Cline and thomas Neubig, Masters of Complexity and Bearers of Great Burden: The Sales Tax System and Compliance Costs for Multistate Retailers, Ernst and Young White Paper, Sep. 8, 1999, pp. 1-34.*

* cited by examiner

*Primary Examiner*—James P Trammell
*Assistant Examiner*—Abdul Basit
(74) *Attorney, Agent, or Firm*—Schmeiser, Olsen & Watts, LLP

(57) ABSTRACT

A method and system for processing tax pertaining to a transaction between a seller and buyer. The transaction triggers a tax due to a tax imposing jurisdiction (TIJ). The transaction has been authorized to be financed for the tax due to the TIJ by a financing network. First transaction data fields are received as data that includes an indication of the tax due to the TIJ and is sufficient for determining the tax due to the TIJ. Second transaction data fields are generated as a copy of the first transaction data fields. A tax transaction identification is assigned to the transaction and appended to the second transaction data fields. An audit and verify process is performed on the second transaction data fields. Results of the audit and verify process are merged into the second transaction data fields. The second transaction data fields are transferred to a transaction data warehouse.

68 Claims, 5 Drawing Sheets

METHOD AND SYSTEM FOR PROCESSING TAX PERTAINING TO A GOODS AND SERVICES TRANSACTION

CROSS-REFERENCES TO RELATED APPLICATIONS

This patent application claims priority to U.S. Provisional No. 60/572,632, filed on May 19, 2004, which incorporated herein by reference in its entirety.

BACKGROUND OF THE INVENTION

1. Technical Field

The present invention relates to collection and administration of taxes resulting from transactions between sellers and buyers of goods and services, and further relates to enforcement of compliance with tax laws of jurisdictions who are legal parties to such transactions.

2. Related Art

Buyers of goods and services are becoming quite sophisticated about making purchases of products from sellers who are located outside of the buyer's sales or consumption tax imposing jurisdiction. For example, many buyers purchase products on the Internet. The seller is not responsible for the collection of tax from buyers outside of their jurisdiction, so no sales or consumption tax is collected. Many buyers of goods and services are technically responsible for the voluntary payment of a "use tax" on such purchases, but fail to pay such taxes to the tax imposing jurisdiction in which they reside either because the buyers are not aware of laws governing use tax, or the buyers are simply not going to voluntarily comply with such laws. Thus, tax imposing jurisdictions are experiencing a decline in reported taxable transactions involving goods and services and an associated decline in tax revenues. Each tax imposing jurisdiction finds it difficult to force compliance, since no comprehensive system of compliance currently exists to require buyers and sellers to comply with the applicable laws that should be applied to the transactions in question.

In addition, tax imposing jurisdictions, as well as sellers serving as tax agents for the tax imposing jurisdictions, incur substantial collection, administrative, and compliance costs relating to taxes due to the complexity of tax laws which are different across different tax imposing jurisdictions.

Thus, there is a need for a method and system that enables a tax imposing jurisdiction to collect taxes from a buyer residing therein for a transaction between the buyer and seller, where the seller is not legally responsible for the collection of such tax. There is also a need for a method and system that simplifies the collection, administration, and compliance process relating to such taxes, while taking into consideration the reality that tax laws will vary among different tax imposing jurisdictions, reflecting the needs of different tax imposing jurisdictions.

SUMMARY OF THE INVENTION

The present invention provides a method and associated computer program product for processing tax pertaining to a goods and services transaction between a seller and a buyer, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction having been authorized to be financed for the tax due to each TIJ by a financing network comprising an electronic network or an electronic payment network, said method comprising:

receiving first transaction data fields that include data pertaining to the transaction, said data including an initial indication of the tax due to each TIJ, said data being sufficient for determining the tax due to each TIJ;

generating second transaction data fields as a copy of the first transaction data fields;

assigning a tax transaction identification to the transaction; and appending the assigned tax transaction identification to the second transaction data fields.

The present invention provides a method and associated computer program product for auditing and verifying tax pertaining to a goods and services transaction between a seller and a buyer, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction having been authorized to be financed for the tax due to each TIJ by a financing network comprising an electronic network or an electronic payment network, said method comprising:

performing an audit and verify process on second transaction data fields of the transaction to determine an extent to which an initial indication of the tax due to each TIJ is accurate, said second transaction data fields including data pertaining to the transaction, said data including the initial indication of the tax due to each TIJ and a unique tax transaction identification that has been assigned to the transaction, said second transaction data fields being sufficient for determining the tax due to each TIJ, said second transaction data fields initially generated by being copied from first transaction data fields having been received from a data source comprising a data stream transmitted by the financing network or a database of the financing network; and merging results of the audit and verify process into the second transaction data fields, said results including a verified tax due to each TIJ.

The present invention provides a method and associated computer program product for processing tax pertaining to an audited and verified goods and services transaction between a seller and a buyer, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction having been authorized to be financed for the tax due to each TIJ by a financing network comprising an electronic network or an electronic payment network, said method comprising:

receiving second transaction data fields of the audited and verified goods and services transaction, said received transaction data fields including data pertaining to the transaction, said data including an initial indication of the tax due to each TIJ, a verified tax due to each TIJ, and a unique tax transaction identification that has been assigned to the transaction, said second transaction data fields initially generated by being copied from first transaction data fields having been received from a data source consisting of a data stream transmitted by the financing network or a database of the financing network; and transferring the received transaction data fields to a transaction data warehouse, wherein a-clearinghouse is adapted to make transaction data stored in the transaction data warehouse available to the at least one TIJ.

The present invention provides a method and associated computer program product for processing tax pertaining to a new or paid-up goods and services transaction between a seller and a buyer, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction being financed for the tax due to each TIJ by the seller who is a legal agent to the transaction for collection and payment of the tax due to each TIJ, said method comprising:

repetitively polling a transaction database until detecting a presence of new data in the transaction database, said new data denoting the transaction as a new transaction or denoting receipt of payment of the tax due to each TIJ for the transaction as a paid-up transaction.

The present invention provides a method and associated computer program product for auditing and verifying tax pertaining to a new goods and services transaction between a seller and a buyer, said new transaction having a transaction value payable by the buyer and receivable by the seller, said new transaction triggering a tax due to at least one tax imposing jurisdiction (TIJ), said tax due to each TIJ being specific to each TIJ of the at least one TIJ, said buyer being liable for the tax due to each TIJ, said new transaction being financed for the tax due to each TIJ by the seller who is a legal agent to the new transaction for collection and payment of the tax due to each TIJ, said method comprising:

performing an audit and verify process on transaction data fields of the new transaction to determine an extent to which an initial indication of the tax due to each TIJ is accurate, said transaction data fields including data pertaining to the transaction, said data including the initial indication of the tax due to each TIJ and a unique tax transaction identification that has been assigned to the transaction, said transaction data fields being sufficient for determining the tax due to each TIJ; and merging results of the audit and verify process into the transaction data fields to generate The present invention provides a method and associated computer program product for processing tax pertaining to a new goods and services transaction between a seller and a buyer, said new transaction having been verified and audited to generate audited and verified transaction data fields, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction being financed for the tax due to each TIJ by the seller who is a legal agent to the transaction for collection and payment of the tax due to each TIJ, said method comprising:

updating a prior version of the transaction data fields in a transaction database with the audited and verified transaction data fields, wherein the prior version exited before being audited and verified and before the unique tax transaction identification was assigned to the transaction.

The present invention provides a method and associated computer program product for processing tax pertaining to paid-up goods and services transaction between a seller and a buyer, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction being financed for the tax due to each TIJ by the seller who is a legal agent to the transaction for collection and payment of the tax due to each TIJ, transaction data fields that include data pertaining to the paid-up transaction and a verified tax due each TIJ having been received from a transaction database, said method comprising:

crediting an account each TIJ by the verified tax due to each TIJ; and debiting an account of the seller by the verified tax due to each TIJ; and updating a transaction data warehouse to reflect the data pertaining to the paid-up transaction, wherein a clearinghouse is adapted to make transaction data stored in the transaction data warehouse available to the at least one TIJ.

The present invention provides a database, said database being a transaction data warehouse, said database comprising:

transaction data fields of at least one goods and services transaction, each transaction being between a buyer and a seller, each transaction having a transaction value paid by the buyer and received by the seller, each transaction triggering a tax due to at least one tax imposing jurisdiction (TIJ), said tax due to each TIJ being specific to each TIJ of the at least one TIJ, said buyer being liable for the tax due to each TIJ; and for each transaction said transaction data fields comprising: seller identification information relating to the seller, buyer identification information relating to the buyer, goods and services product classification data as defined by laws of the at least one TIJ for classifying goods and/or services of said each transaction, an initial indication of the tax due to each TIJ of said each transaction, a unique tax transaction identification assigned to said each transaction, and a verified tax paid or due to be paid to each TIJ of said each transaction.

The present invention provides a method for using a database, said database being a transaction data warehouse, said method comprising:

reading selected transaction data from transaction data fields in the database;

said transaction data fields pertaining to at least one goods and services transaction, each transaction being between a buyer and a seller, each transaction having a transaction value paid by the buyer and received by the seller, each transaction triggering a tax due to at least one tax imposing jurisdiction (TIJ), said tax due to each TIJ being specific to each TIJ of the at least one TIJ, said buyer being liable for the tax due to each TIJ; and for a transaction of the at least one transaction, said selected transaction data comprising at least one of: an initial indication of the tax due to each TIJ of the transaction, a unique tax transaction identification assigned to the transaction, and a verified tax paid or due to be paid to each TIJ of the transaction, a type of the tax paid or due to be paid to each TIJ of the transaction, an indication that the transaction was audited and verified, an indication of a portion of the transaction not subject to tax, and an application certification number of a software application whose accuracy for calculating the initial indication of the tax due to the a first TIJ of the at least one TIJ has been certified by at least one independent party that is recognized by the first TIJ for said calculating.

The present invention provides a method and system that enables a tax imposing jurisdiction to collect taxes from a buyer residing therein for a transaction between the buyer and seller, where the seller is not legally responsible for the collection of such tax.

The present invention further provides a method and system that simplifies the collection, administration, and compliance process relating to such taxes, while taking into consideration the reality that tax laws will vary among different tax imposing jurisdictions, reflecting the needs of different tax imposing jurisdictions.

DETAILED DESCRIPTION OF THE INVENTION

Figure 1:
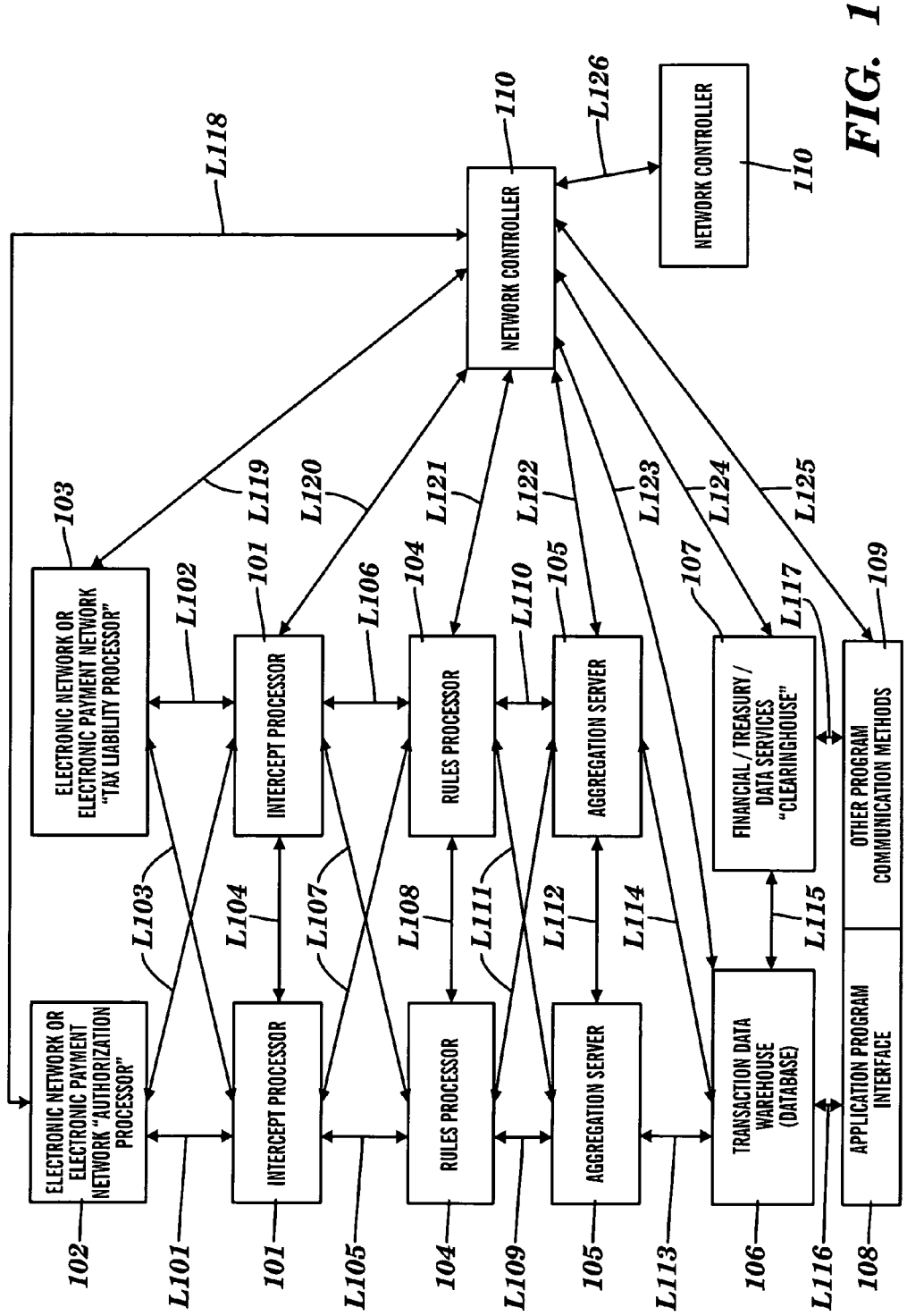
FIG. 1 is a block diagram of a high level design and system configuration of a Network System, in accordance with embodiments of the present invention.

Referring now to the Drawings, wherein like reference numerals designate identical or corresponding parts throughout the several views, and more particularly to FIG. 1 through 5 thereof, the methodology, overall system architecture, and system control operation of the present invention is shown. Appendix A includes definitions of selected words and phrases appearing herein. Appendix A also serves as a glossary that includes examples illustrating and/or clarifying some of the definitions appearing in Appendix A.

The present invention relates processing a "goods and services transaction", which is a transaction of at least one good and/or a least one service between a merchant (i.e., seller) and a buyer, said transaction having a transaction value payable by the buyer and receivable by the seller, said transaction triggering a tax due to at least one tax imposing jurisdiction (TIJ), said tax due to each TIJ being specific to each TIJ, said buyer being liable for the tax due to each TIJ.

The present invention provides a local network, for auditing and transferring transactional and/or consumption based taxes directly to taxing levying authorities.

The present invention is directed to methods, computer-based systems and related computer hardware and software products and implementations that will audit and verify tax calculations relating to transactions as (a) the transaction is being authorized for payment in an electronic payment network and/or electronic network, or (b) funds relating to such transactions have been collected by an Electronic Payment Network (EPN) and/or Electronic Network (EN) without an automated authorization process occurring.

The Network System of the present invention performs an audit and verify process if the tax laws of appropriate tax imposing jurisdictions are being properly applied to a transaction based upon the data provided by the seller of goods or services and create additional information that can be used by tax imposing jurisdictions through a Clearinghouse for self-directed analysis, collection, compliance, and administrative purposes.

To the extent that the audit and verify process determines, based upon the tax laws of the tax imposing jurisdiction, that a tax liability is due from a buyer/consumer and such tax is not the responsibility of the seller to collect, the network system applies the rules of the tax imposing jurisdiction to assist in resolving the matter. The resolution options might include, but not be limited to, immediately charging the same credit card used by the buyer for the purchase of goods or services, to the extent permitted by the laws of the tax imposing jurisdictions as well as any required permissions required between the credit card holder and the credit card company.

Other solutions relating to tax collection may include the tax imposing jurisdiction charging additional taxes or penalties to be added to the personal or corporate income tax returns of the party for which there is a tax liability. Another solution might be to enable the buyer/consumer to "opt-in" to a plan that would automatically charge a credit card at the end of the next credit card billing period, or face fines and penalties that would increase after initial notifications were provided. Such notifications might be included in the normal billing statement of the credit/debit card company employed to make the purchase that triggered the associated tax liability.

Data in the system is aggregated in a Transaction Data Warehouse (denoted as Database 106 in FIG. 1 and described infra) and made available to tax imposing jurisdictions through a Clearinghouse repository. The tax imposing jurisdictions will have access to appropriate transaction data directly, or by employing the assistance of approved government service providers ("GSP" or "GSPs"). Access to the Transaction Data Warehouse and associated Clearinghouse may be based on and Open Standards architecture and may employ an Application Program Interface ("API")

The present invention, including the methods, principles, computer-based systems and related hardware and software products and implementations, are collectively referred to as a "Network System."

The Network System addresses all of the preceding issues. The Network System leverages and extends existing Electronic Networks and Electronic Payment Networks to create a low-cost infrastructure focused on the needs of tax imposing jurisdictions, as well as the needs of sellers to reduce their role and administrative expense in the collection of tax that is fundamentally imposed on the consumption of goods and services by buyers. Tax imposing jurisdictions are provided with the capability for frequent or more immediate access to information on transactions, tax calculations, and tax finds in a secure Clearinghouse environment.

Certain transactions that are passing into or through the network may be selected to be audited and verified electronically, resulting in a reduction in the costs associated with tax collection, compliance, and administration for the tax imposing jurisdiction. Sellers can rely on the-Network System to audit and verify their tax calculations, and transfer taxes collected by the merchant seller automatically to the Clearinghouse, thus eliminating a substantial administrative and compliance burden on the part of the seller. It is conceivable that to the extent transactions are processed through the Network System, merchant sellers could virtually eliminate the need to prepare individual tax returns to the extent that transactions that would normally be compiled and summarized to prepare the tax returns are already reported through the Network System.

Additionally, the Network System alleviates tax imposing jurisdictions of the substantial burden associated with auditing and verifying taxes, and instead, enables the tax imposing jurisdictions to focus their scarce resources and attention toward other processes, including analyzing the way in which buyers and sellers are applying tax laws to the transactions they are reporting though the Network System. The tax imposing jurisdictions are free to maintain their own tax rates and laws, and do not have to adopt any common or simplified approach to tax calculations, although they would certainly be free to do so and still employ the Network System.

Because the Network System may be designed around Open Standards, each tax imposing jurisdiction may have the freedom and flexibility to access data directly or indirectly through an API so that the Network System might be connected to existing legacy systems of the tax imposing jurisdictions, or to new systems, with the assistance of employees of the tax imposing jurisdictions or with the assistance of approved government service providers, or other service providers, as the case may be. From the operational viewpoint of the tax imposing jurisdictions, the Network System and associated Clearinghouse provides them the flexibility to apply their own laws and business rules to the processing and analysis of transactions they are a party to, rather than being forced to adopt a single way of doing business.

The invention provides methods, systems, and computer program product to assist tax imposing jurisdictions in accessing and aggregating data from Electronic Payment Networks and/or Electronic Networks.

The present invention provides methods, systems, and computer program product to assist tax imposing jurisdictions in auditing and verifying transactions and their associated tax liabilities, as well as further coding a transaction in an Electronic Payment Network and/or Electronic Network to certify that the transaction has been audited and verified, along with making the transaction data fields, audited transaction data fields, and transaction data packets available to tax imposing jurisdictions through a Transaction Data Warehouse repository.

The present invention provides methods, systems, and computer program product to enable the creation of a Clearinghouse along with the associated functionality necessary for the self-directed operation of the Clearinghouse by parties, including-but not limited to, tax imposing jurisdictions, to perform Clearinghouse functions associated with the Clearinghouse.

The present invention provides methods, systems, and computer program products, and network available to determine whether the underlying tax calculation has been performed through a tax calculation software program that, in itself, has been certified, and perhaps exempt the transaction from the audit and verify certification, while still accumulating data for the transaction data fields that comprise audited transaction data fields.

The present invention provides methods, systems, and computer program products to provide for collection, aggregation, routing, co-mingling, allocating or crediting, and distribution of tax monies to the financial accounts of tax imposing jurisdictions primarily on a self-directed basis.

The present invention provides methods, systems, and computer program products for enabling a tax imposing jurisdiction to refund or return taxes to a tax payer via an Electronic Payment Network and/or Electronic Network as a result of the return or refund of a goods or services where the tax on the original transaction was audited and verified by the methods of the present invention.

The present invention provides effective methods, systems, and computer program products to charge a tax to the buyer of goods or services when there is no responsibility for the seller of such goods and services to collect taxes as agent for the tax imposing jurisdiction.

The present invention provides methods, systems, and computer program products to aggregate audited and verified tax data in the form of audited transaction data fields based upon transaction data fields that have been accumulated from Electronic Networks and Electronic Payment Network sources.

The present invention provides methods, systems, and computer program products to furnish tax imposing jurisdictions with an Open Standards development platform enabling each tax imposing jurisdiction to develop its own interface to the Transaction Data Warehouse and associated Clearinghouse features and functionality to apply its own business rules and logic.

The present invention provides methods, systems, and computer program products to provide tax imposing jurisdictions with a framework to self direct a system, shared by many tax imposing jurisdictions, and apply tax laws and associated business rules associated with a specific tax imposing jurisdiction.

The present invention provides methods, systems, and computer program products to intercept the data stream of an Electronic Network and/or Electronic Payment Network, or access an underlying database containing transaction data, where the underlying system of paying participating sellers for goods and services sold through an Electronic Network and/or Electronic Payment Network employs an authorization and capture process or an authorization and delayed capture process for the purpose of extending credit to a buyer for payment to the seller.

The present invention provides methods, systems, and computer program products to intercept the data stream of an Electronic Network and/or Electronic Payment Network, or access an underlying database containing transaction data, where the underlying system of paying participating sellers for goods and services sold through an Electronic Network and/or Electronic Payment Network does not employ an authorization and capture process or an authorization and delayed capture process, but instead relies on other means for payment or settlement including, but not limited to, the receipt of payment from a buyer.

The present invention provides a process of separately identifying data collected by tax agents through an Electronic Payment Network or Electronic Network for analytical and data processing purposes, including but not limited to, the aggregation of data relating to tax liabilities assessed by tax agents for further analysis.

The present invention provides a process of assigning an identification number to a transaction for purposes of identifying analyzing, and/or auditing and verifying, and/or aggregating, tax data fields and/or tax liabilities or funds associated with such tax liabilities, arising from transactions.

The present invention provides a process of conducting statistical, algorithmic, or other sampling techniques on transaction data fields to the extent such calculations are performed by a program or software application or service that has been tested and certified as accurate.

The present invention provides a process of segregating tax amounts or tax liabilities from total payments received in settlement of amounts due from customers for the individual (uncoupled) purposes of analysis, data processing, and transfer of funds to tax imposing jurisdictions and/or their financial institutions, where such transfer of funds to such tax imposing jurisdictions or their financial institution is tied primarily to the receipt of funds by the tax agent, either through receipt of funds from the buyer, or authorization by the EN or EPN, rather than to passage of a certain amount of time or existing tax law.

The present invention provides a process of operating a Clearinghouse with respect to data.

The present invention provides a process of operating a Clearinghouse with respect to the collection and management of funds due, funds collected, funds paid, and funds payable to tax imposing jurisdictions as well as to tax agents and tax payers.

The present invention provides a process of collecting transaction data fields relating to individual transactions and making such data available to tax imposing jurisdictions.

The present invention provides a process of separately identifying funds relating to tax liabilities collected by tax agents through an Electronic Payment Network or Electronic Network.

The present invention provides a process of maintaining co-mingled accounts and related funds on behalf of buyers, sellers, and tax imposing jurisdiction, for purposes of settling amounts relating to tax liabilities, or refunds of such liabilities, between tax imposing jurisdictions, buyers, sellers, and providers of payment or credits, such as a credit card company, and tax agents.

The system of the present invention comprises a network, such as a worldwide network or a regional network, for transferring transaction data fields relating to transactions, as well as associated taxes, tax liabilities, and/or funds relating to such taxes and/or tax liabilities, from Electronic Payment Networks or Electronic Networks and/or financial institutions related to such Electronic Payment Networks or Electronic Networks, to tax imposing jurisdictions and/or financial institutions related to such tax imposing jurisdictions.

The present invention performs various processing functions on such transaction data fields, including but not limited to, assigning a tax transaction identification to the transaction, auditing and verifying transactions and associated transaction data fields to determine if tax liabilities exist, as well as providing data to the Electronic Payment Network and/or Electronic Network that the transaction associated with the transaction data fields has completed the audit and verify process. Such processes can be performed on individual transactions, groups of transactions, and transmitted individually, in groups, in a batch process, or in any other processing scheme. The Electronic Payment Network and/or Electronic Network is then in a position, based upon further processing performed by the present invention, to transfer, or enable the transfer of, data and/or funds related to taxes that have either been made available for the payment of taxes, either through the authorization of payment process that occurs with certain Electronic Payment Networks (e.g., credit card companies), or through the payment of amounts due to the seller of goods or services, such as a payment made for the purchase of shares of common stock where the transaction and associated tax information is generally recorded through an Electronic Network such as a stock exchange, directly to tax imposing jurisdictions associated with a transaction.

Aspects of the present invention may provide for data and system security both from a data encryption standpoint as well as from a permissions standpoint in the handling of data, including transmission via all links to various parts or subsystems of the present invention, while such system security, data encryption, and permission features are not required for the successful operation of the present invention. Aspects of the present invention may be designed to incorporate appropriate fault tolerance or failover technologies, although not required for the operation of the present invention.

Software applications, computers, servers, operating systems, or other devices included in the network may have the capabilities of distributed computing designed into the system architecture, although such capabilities are not required for the operation of the present invention. To the extent data links have been described as connecting software applications, servers, computers, databases, peripheral devices, Electronic Networks, Electronic Payment Networks, Tax imposing jurisdictions, or their associated financial institutions once, the data links are assumed to continue operating in the same way for all data communicated between such software applications, computers, servers, devices, Electronic Networks, Electronic Payment Networks, tax imposing jurisdictions, or their associated financial institutions.

The present invention is designed to process data that is being created or processed on a real time basis arising from a data stream of an Electronic Network or an Electronic Payment Network, and, as such, the present invention is, by its very architecture and design, a real time system. While the present invention operates on a real time basis, real time operation is not required for the present invention since the system is also capable of delivering data from such real time operation in a delayed or batch processing mode, based upon the preferences of the various parties involved in the operation of the present invention individually or collectively.

FIG. 1 is a block diagram of a high level design and system configuration of a Network System, in accordance with embodiments of the present invention. As shown on FIG. 1, the system of the present invention includes an Intercept Processor 101 connected via data link L101 to an Electronic Payment Network and/or Electronic Network Authorization Processor 102 ("Authorization Processor"), where an action is being taken to authorize a transaction for payment (i.e., financing by a financing network) based upon rules applied by the operator of the financing network, Examples of financing entities include the Electronic Payment Network and/or Electronic Network. An example of an Electronic Payment Network is a credit card company authorizing a charge to the credit card of a buyer, who is a customer of the credit card company, in settlement of a Transaction.

In some cases, the Electronic Payment Network and/or Electronic Network may not authorize the payment of amounts in settlement of a transaction and instead relies on the purchaser to make a payment or similar action to cause funds or amounts to be credited to their account on such Electronic Payment Network and/or Electronic Network. In such cases, the Electronic Payment Network and/or Electronic Network Tax Liability Processor 103 ("Tax Liability Processor") will connect with an Intercept Processor 101 via data link L102.

If Intercept Processor 101 were co-located with Authorization Processor 102 the data link L101 might be made through a number of connectivity technologies including, but not limited to, Local Bus, PCMCIA Bus, USB, EIA-232, ISDN, VMEbus, firewire, fiber channels, a LAN, wireless links such as a cellular network, fiber cables, and other successor technologies that advance the capabilities of such connectivity technologies. Hereinafter, the collection of technologies that might be used to accomplish this connection shall be referred to as "local connectivity technologies"

In the event that Intercept Processor 101 is in a location which is remote from the Authorization Processor 102, the data link L101 might be made through a number of remote connectivity technologies including but not limited to a PSTN, a dedicated or leased high speed digital land line with T-1 to T-3 bandwidth, ISDN links, WAN, a cable network, DSL, a virtual private network ("VPN"), wireless links such as a cellular network, a very small aperture terminal (VSAT) link, a LEO or GEO satellite link, etc., and other successor technologies that advance the capabilities of such connectivity technologies. Hereinafter, the collection of technologies that might be used to accomplish this remote connection shall be referred to as "remote connectivity technologies". As an option, the software applications of Intercept Processor 101 may reside physically on Authorization Processor 102.

If Intercept Processor 101 were co-located with Tax Liability Processor 103 the data link L102 might be made through local connectivity technologies and/or remote connectivity technologies. As an option, the software applications of Intercept Processor 101 may reside physically on Tax Liability Processor 103.

While not required for the operation of the present invention, Intercept Processor 101 may be connected to other Authorization Processors 102 or other Tax Liability Processors 103 via data link L103 for the reasons including, but not limited to, the harnessing the unused processing cycles of other Intercept Processors 101 as well as other design and processing considerations, including, but not limited to, fault tolerance, failover, redundancy, latency, load balance, as well as potential system failure issues. Additionally and while not required for the operation of the present invention, Intercept Processor 101 may be connected to other Intercept Processors 101 via data link L104 for the same or similar reasons. Data link L103 and or L104 may be made through local connectivity technologies and/or remote connectivity technologies.

The data links L101, L102 and L103 can transmit transaction data fields associated with transactions to Intercept Processor 101. The software applications that invoke the transmission of data from the Electronic Network or the Electronic Payment Network are integral parts of Intercept Processor 101 as well as Tax Liability Processor 103. The software applications to invoke the transmission of data between Intercept Processor 101 and Authorization Processor 102 may reside on Intercept Processor 101 and alternatively can be accomplished with a similar or companion software application installed on Authorization Processor 102 or through other software applications or methods for accessing such data, including, but not limited to, developing specific programs to accomplish such tasks, or by employing the Application Program Interface 108 or Other Program Communication Methods 109.

Intercept Processor 101 transmits data associated with transactions and transaction data fields to Rules Processor 104. Intercept Processor 101 may retain Transaction data fields in volatile memory (e.g., RAM) and/or may write to non-volatile memory (e.g., a hard drive, optical disc, etc) until such data can be transmitted to the Rules Processor 104 via data link L105, L106 or L107. Data link L105, L106 and L107 may employ local connectivity technologies and/or remote connectivity technologies. While not required for the operation of the present invention, Rules Processor 104 may transmit data to other Rules Processor 104 via data link L108 for reasons including, but not limited to, the harnessing the unused processing cycles of other Rules Processor 104 as well as other design and processing considerations, including, but not limited to, fault tolerance, failover, redundancy, latency, load balance, as well as potential system failure considerations. The software applications of Rules Processor 104 may reside on Rules Processor 104 or alternatively on Intercept Processor 101. Rules Processor 104 includes programs and applications containing business rules required to conduct audit and verify functions, including calculating and verifying rates of tax as well as business rules required for the application of such rates of tax to transaction data to determine if the type of tax, as well as the rates of tax, are appropriate for the specific transaction, based upon the transaction data fields obtained from the Electronic Payment Network, or Electronic Network. While not required for the operation of the present invention, Rules Processor 104 may maintain such rates of tax and associated business rules to conduct its audit and verify processes in volatile memory (e.g., RAM) and/or non-volatile memory such as, but not limited to, a hard drive or optical disc. Alternatively, such rates of tax and associated business rules could be accessed by methods that include, but not limited to, Rules Processor 104 communicating with a third party application containing such rates of tax and associated business rules, or via a web services library or an associated Application Program Interface published by a third party application provider.

Rules Processor 104 employs tax and business rules to audit and verify transaction data fields. Rules Processor 104 creates, as one of its processes, transaction data packets, which are then transferred to the Aggregation Server 105 or other Aggregation Servers 105 via data link L109, L110, or L111. Data link L109, L110, or L111 may employ local communication technologies or remote communication technologies depending on the amount of data being processed by Aggregation Server 105 or other Aggregation Servers 105. While not required for the operation of the present invention, Aggregation Server 105 may transmit data to other Aggregation Servers 105 via data link L112 for reasons including, but not limited to, the harnessing the unused processing cycles of other Aggregation Servers 105 as well as other design and processing considerations, including, but not limited to, fault tolerance, failover, redundancy, latency, load balance, as well as potential system failure considerations.

To the extent that the functions of Rules Processor 104 are performed by a GST or other service provider, the system employs business rules such as, but not limited to, a statistical or other algorithmically derived sampling methods to determine which transactions, if any, are subject to the audit and verify processes. In such a case, Rules Processor 104 creates a transaction sampling scheme to determine which transactions will be subject to the audit and verify process. The audit and verify resulting from execution of Rules Processor 104 are transferred to the Aggregation Server 105 or other Aggregation Servers 105 via data link L109, L110, or L111. Data link L109, L110, or L1 may employ local communication technologies or remote communication technologies depending on the amount of data being processed by Aggregation Server 105 or other Aggregation Servers 105. While not required for the operation of the present invention, Aggregation Server 105 may transmit data to other Aggregation Servers 105 via data link L112 for reasons including, but not limited to, the harnessing the unused processing cycles of other Aggregation Servers 105 as well as other design and processing considerations, including, but not limited to, fault tolerance, failover, redundancy, latency, load balance, as well as potential system failure considerations.

Aggregation Server 105 comprises software applications to manage the process of collecting, aggregating, and transferring, separately, collectively, or in any combination, and is not limited to, transaction data fields, audited transaction data fields, transaction data packets, tax liability information, tax information, information arising from the combination or analysis of any data from such sources, as well as associated information relating to funds collected and/or managed, or amounts funds due, funds payable, or funds receivable that arise from their association with or analysis or combination with such information. Such information is referred to as "Data", and is transferred and stored to a Transaction Data Warehouse (Database) 106. Database 106 is designed for the purpose of storing such Data as well as making such Data available for further processing and analysis. Database 106 is connected to Aggregation Server 105 via data link L113 and L114. Data links L113 and L114 may employ local connectivity technologies and/or remote connectivity technologies.

The Database 106 is connected to the Financial/Treasury/Data Services Clearinghouse 107 ("Clearinghouse") via data link L115. While not indicated in FIG. 1, and not required for operation of the present invention, Clearinghouse 107 may be transfer Data to other Clearinghouses 107 for reasons including, but not limited to, the harnessing the unused processing cycles of other Clearinghouses 107 as well as other design and processing considerations, including, but not limited to, fault tolerance, failover, redundancy, latency, load balance, as well as potential system failure considerations.

The Database 106 and the Clearinghouse 107 are accessed by the Application Program Interface 108 or Other Program Communication Methods 109 via data links L116 and L117, respectively, and may employ local connectivity technologies and/or remote connectivity technologies. The software programs and/or applications will access Database 106 and Clearinghouse 107 by including references to, or invoking, certain programs, applications, or objects, or the object program layer and/or other features and capabilities accessed via Application Program Interface 108.

In addition to, or as an alternative to accessing Database 106 and Clearinghouse 107, Other Program Communication Methods 109 can be used to access information stored in Database 106 and Clearinghouse 107. These methods include, but are not limited to, software program(s) or application(s) developed that do not require access to Application Program Interface 108 and instead access Database 106 and Clearinghouse 107 directly, processes that communicate certain data via verbal instructions over a telephone to an operator of the present invention, or processes that employ fax machines to communicate written instructions to the operator of the present invention. To the extent Other Program Communication Methods 109 is employed, data links L116 and L117 will be modified, augmented, or extended accordingly.

While not required for the operation of the present invention, Network Controller 110 can be employed to monitor the systems, subsystems, and processes occurring on all, or any of, Authorization Processor 102 via data link L118, Tax Liability Processor 103 via data link L119, Intercept Processor 101 via data link L120, Rules Processor 104 via data link L121, Aggregation Server 105 via data link L122, Database 106 via data link L123, Clearinghouse 107 via data link L124, as well as the Application Program Interface 108 via data link L125. The Network Controller 110 enables operators of the Network System to perform operations that include, but are not limited to, monitoring the operation of, and identify problems that might exist within, various aspects of the Network System. Data links L118, L119, L120, L121, L122, L123, L124, and L125 may employ local connectivity technologies and/or remote connectivity technologies depending on the amount of Data being processed by Network Controller 101 as well as other design and processing considerations, including, but not limited to, fault tolerance, failover, redundancy, latency, load balance, as well as potential system failure. While not required for the operation of the present invention, Network Controller 110 may be connected to another Network Controller 110 via data link L126 and may employ local connectivity technologies and/or remote connectivity technologies and may transfer Data to other Network Controllers 110 for reasons including, but not limited to, the harnessing the unused processing cycles of other Network Controllers 110 as well as other design and processing considerations, including, but not limited to, fault tolerance, failover, redundancy, latency, load balance, as well as potential system failure. To the extent that tax calculations are being performed by a government service provider or other provider, as the case may be, data links L118, L119, L120, and L121 may not be required for operation of the system.

The principals set forth in FIG. 1 related to distributed computing are not repeated at every aspect, embodiment, or step in the description herein of present invention, but nonetheless may be employed throughout the Network System as applicable.

Figure 2:
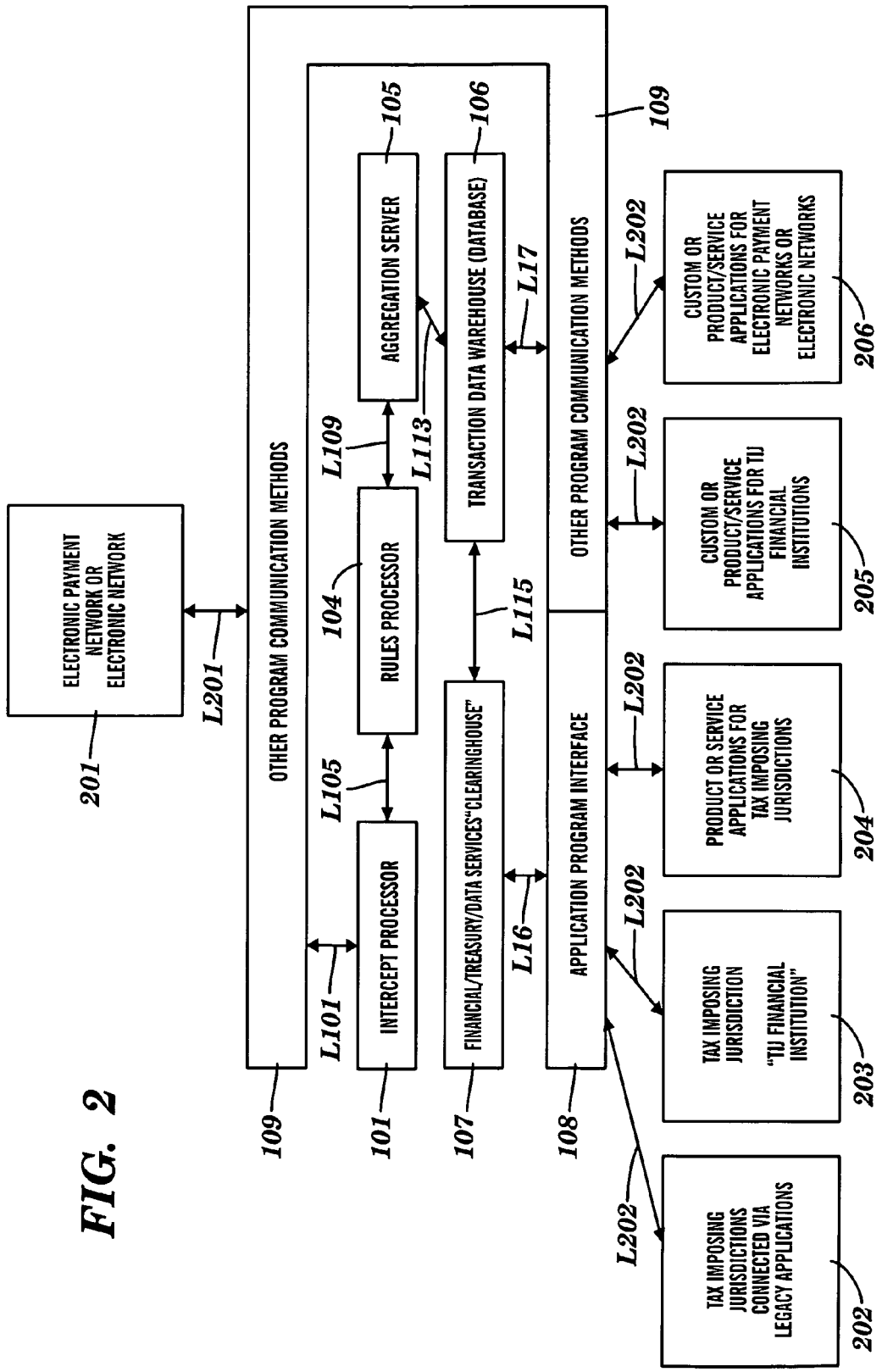
FIG. 2 is a block diagram of a high level design and configuration of the Network System of FIG. 1 viewed from a functionality standpoint, in accordance with embodiments of the present invention.

FIG. 2 is a block diagram of a high level design and configuration of the Network System of FIG. 1 viewed from a functionality standpoint, in accordance with embodiments of the present invention. FIG. 2 is a different view of the system of the present invention as shown in FIG. 1 and is arranged to display the present invention from the perspective of potential users of the present invention, with no references to multiple data link paths or other features required for distributed computing, as well as no references to Network Controller 110 (see FIG. 1) or the data links required to employ Network Controller 110 (see FIG. 1).

In FIG. 1, Other Program Communication Methods 109 is shown as being directly connected to the clearinghouse 107 via data link L117, directly connected to the network controller 110 via data link L125, and indirectly connected to the electronic network or electronic networks 102 and 103 via data links L118 and L119, respectively, by making use of the aforementioned connection to the network controller 110. In FIG. 2, Other Program Communication Methods 109 is shown with additional connections L201, L17, and L202 as shown.

Groups connected to the present invention include the Electronic Payment Network and/or Electronic Network 201 that employs Other Program Communication Methods 109 (see FIG. 1) such as modifying an existing software program, or developing a unique software program, to establish a programmatic path L201 to accomplish the process of enabling the routing of transaction data fields to the Intercept Processor 101 (see FIG. 1) via data link L101 (see FIG. 1), enabling Intercept Data Processor 101 (see FIG. 1) to conduct its processes, transferring some or all the results of such processes to Rules Processor 104 (see FIG. 1) via data link L105 (see FIG. 1), further enabling Rules Processor 104 (see FIG. 1) to perform its processes, transferring some or all of the results of such processes to Aggregation Server 105 (see FIG. 1) via data link L109 (see FIG. 1), further enabling Aggregation Server 105 (see FIG. 1) to perform its processes, transferring some or all of the results of such processes to Database 106 (see FIG. 1) via data link L113 (see FIG. 1).

Database 106 is the repository for all data and is available for processes and/or functions performed by Clearinghouse 107 (see FIG. 1) with respect to Data and/or processes relating to funds associated with such Data. Database 106 (see FIG. 1) and/or Clearinghouse 107 (see FIG. 1) are accessed via the Application Program Interface 108 and/or Other Program Communication Methods 109 via Data links L116 (see FIG. 1). L117 (see FIG. 1), L16 (see FIG. 2), and L17 (see FIG. 2).

Multiple parties may link to (via data link L202) and employ the Application Program Interface 108 (see FIG. 1) and/or Other Program Communication Methods 109 (see FIG. 1) to establish an ability to access Database 106 (see FIG. 1) or Clearinghouse 107 (see FIG. 1). Examples of such parties include, but are not limited to, a tax imposing jurisdiction 202 employing Application Program Interface 108 (see FIG. 1) to modify an existing legacy application, a financial institution associated with a tax imposing jurisdiction, hereinafter referred to as a "TIJ Financial Institution" 203 employing Other Program Communication Methods 109 (see FIG. 1) such as a specially created software program designed for performing certain financial or treasury Clearinghouse functions relating to Clearinghouse 107 (see FIG. 1) while also employing Application Program Interface 108 (see FIG. 1) to accomplish other tasks. Certain software products or software service applications 204 might be created for the purpose and offered for the use of tax imposing jurisdictions or other parties associated to such TIJs, such as a government service provider, to either purchase or license for a one time fee, or an ongoing rental or licensing fee. A TIJ Financial Institution might create, or have access to, Custom Applications 205 or services rendered through the use of a combination of employing the Application Program Interface 108 (see FIG. 1) to accomplish certain functions, as well as employing Other Program Communication Methods 109 (see FIG. 1) such as faxing, when policies of the financial institution require a hard copy or facsimile of funds transfer instructions before the instructions relating to such transfer can be performed. A further example of such parties is an Electronic Payment Network and/or Electronic Network 201 that employs a Custom or Product/Service Application 206 designed to invoke the capabilities of Application Program Interface 108 (see FIG. 1) to accomplish tasks in addition to those that may be accomplished connecting Intercept Processor 101 (see FIG. 1) to such Electronic Payment Network and/or Electronic Network 201 via Other Program Communication Methods 109 (see FIG. 1).

Figure 3:
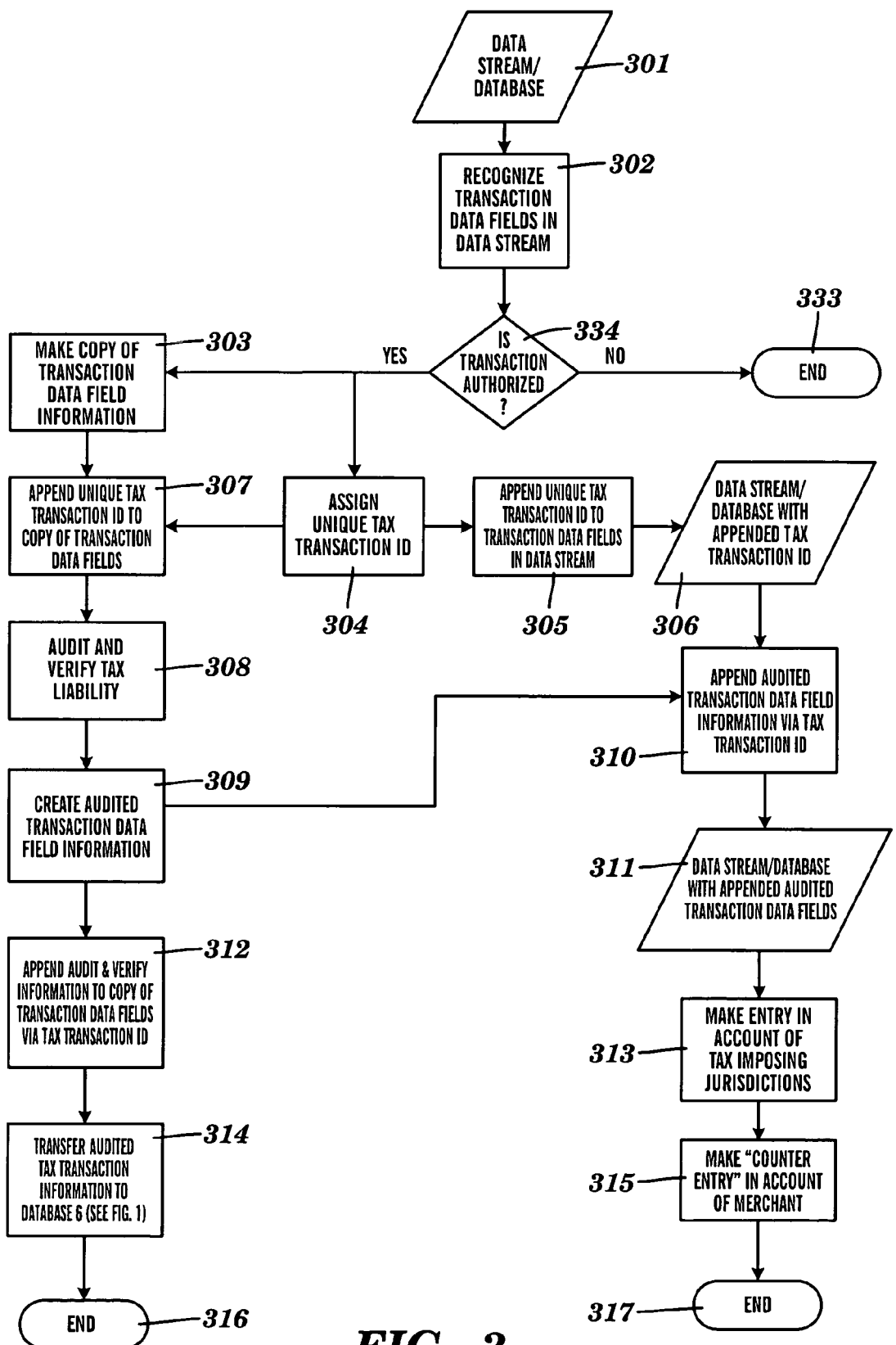
FIG. 3 is a flowchart depicting a processing of tax aspects of a sale of goods and/or services from a seller to a buyer in conjunction with the Network System of FIGS. 1 and 2, in accordance with embodiments of the present invention.

FIG. 3 is a flowchart depicting a processing of tax aspects of a sale of goods and/or services from a seller to a buyer in conjunction with the Network System of FIGS. 1 and 2, in accordance with embodiments of the present invention. FIG. 3 depicts an implementation of the present invention dealing with an Electronic Payment Network ("EPN") such as a credit card processing network, and the ways by which the present invention accesses transaction data fields associated with transactions which are then processed by Intercept Processor 101 (see FIG. 1). The process may be performed by the Network, or a GST, or other service provider.

One of the first steps taken by the credit card processing network is credit card authorization, or authorization, defined as the process of verifying that the credit, debit, corporate, or other Electronic Payment Network and/or Electronic Network card (or account associated with such card) has sufficient funds or credit available to cover the amount of the transaction. An authorization transaction generally does not transfer funds. Rather, the authorization process places a hold on the cardholder's open-to-buy limit, lowering the cardholder's limit by the amount of the amount authorized. This authorization is a "first step" of an authorization and delayed capture transaction, wherein the "second step" of the authorization and delayed capture transaction, namely the capture, occurs at a later point in time when the goods and/or services have been shipped (for goods) or provided (for services) to the buyer. For purposes of the implementation presented in FIG. 3, it is assumed that the credit card transaction being conducted is an authorized transaction.

A collection of transaction data associated with one or more transactions is passing through an Electronic Payment Network and/or Electronic Network. This is referred to, or defined, as a "data stream/database" 301. Data stream/database 301, in this example case, is arising through the aggregation of transaction data from many different merchant sellers via many different communication methods and protocols. Data stream/database 301 permits employment of either a data stream or a database alternative.

If the data stream alternative of the data stream/database 301 is employed, then step 302 recognizes in transactions and associated transaction data fields in the data stream 301 through a software program or application designed to read or interpret data while in the data stream (performed by Intercept Processor 101—see FIG. 1). The software program or application may read or interpret original data, metadata associated with original data, or a copy of the original data, depending on the particular implementation of the present invention with a particular Electronic Payment Network, or Electronic Network.

If the database alternative of the data stream/database 301 is employed, then step 302 obtains data can by accessing a database containing such data, preferably after the authorization process has been completed, although such database could also be accessed prior to the beginning of the authorization process (performed by Authorization Processor 102—see FIG. 1).

In step 334, a determination is made as to whether the transaction has successfully completed the authorization process (performed by Authorization Processor 102—see FIG. 1) and received authorization for payment by the credit card company. If the answer in step 334 is "No", then processing of the transaction and associated transaction data fields terminates in step 333. If the answer in step 334 is "Yes", two processes next occur with one of the two processes beginning in step 303 and the other of the two processes beginning in step 304, respectively.

In step 303, a copy is created (performed by Intercept Processor 101—see FIG. 1) of the transaction data fields associated with the authorized transaction from reading original data, metadata, or a copy of the original data, depending on the specific implementation of the present invention with the Electronic Payment Network and/or Electronic Network.

In step 304, a unique tax transaction identification ("ID") (e.g., a number) is assigned (performed by Intercept Processor 101—see FIG. 1). An alternative implementation is to accept a transaction number already assigned by the credit card company or other credit card authorization service provider to the transaction as the unique tax transaction ID of step 304 (performed by Intercept Processor 101—see FIG. 1).

In step 305, the unique tax transaction ID of step 304 is appended to transaction data fields associated with the data stream/database 306 (performed by Intercept Processor 101—see FIG. 1).

While not required for the operation of the present Invention, the process of appending may be accomplished by transmitting the tax unique transaction ID 304 (performed by Intercept Processor 101—see FIG. 1) to the credit card company where such data may be either written to a database maintained by the credit card company, or the data could reenter the data stream for association or appending (step 305) while other processes unrelated to the present invention are occurring. To the extent that the unique tax transaction ID in step 304 references a tax transaction number assigned by a credit card company or other credit card authorization service provider, there is no need to append a unique transaction ID to data or a database maintained by a credit card company or Credit Card Authorization service provider. This determination is made in step 305 by Intercept Processor 101 (see FIG. 1). The unique tax transaction ID may be maintained in a database owned by, or for the benefit of, the merchant seller. The result of this is that a transaction that has completed the authorization process 334 has a unique tax transaction ID 304 assigned, but the transaction has not yet been through the steps required for capture and the transaction has not yet completed the audit and verify process of step 308.

Step 307 (performed by Intercept Processor 101—see FIG. 1) appends the unique tax transaction ID of step 304 to the copy of transaction data field information previously generated in step 303 (i.e., step 307 is performed after steps 303 and 304 are performed).

The transaction data fields are next analyzed by the audit and verify process in step 308 (performed by Rules Processor 104—see FIG. 1) to determine, inter alia, if the tax liability provided in the transaction data fields with respect to the associated transaction is accurate, or within a range deemed acceptable by the appropriate tax imposing jurisdictions, based upon their applicable tax laws. Examples of outcomes that may occur in the audit and verify process of step 308 include, but are not limited to:

(1) a determination that a re-calculated tax liability (within the audit and verify step 308) is acceptable based upon the tax laws of the tax imposing jurisdiction applied to the transaction data fields associated with the transaction;

(2) a determination based on transaction data fields associated with the transaction that no tax liability exists;

(3) a determination based on transaction data fields associated with the transaction that the seller's use tax or the buyer's use tax is applicable to the transaction but no such taxes were identified for payment since the merchant seller did not have a nexus with the buyer; and (4) a determination based on transaction data fields associated with the transaction that the original tax calculation, as provided in the transaction data fields from the original data stream is mathematically inaccurate.

An alternative embodiment of the present invention includes examining the transaction data fields associated with a transaction (performed by Rules Processor 104—see FIG. 1) to determine if data exists relating to the tax calculation software application employed by the merchant seller to perform tax calculations. To the extent the software application that has been certified by an independent party recognized by the applicable tax imposing jurisdiction for producing accurate and reliable tax calculations for the specific type of tax calculation being calculated, the software is deemed a "Certified Tax Calculation Application" and different processes may be applied to transaction data fields associated with tax calculations where such calculations have been performed by a Certified Tax Calculation Application. Examples of said different processes include, but are not limited to:

(1) accepting such calculations with no separate audit and verify process, while still creating audited transaction data field information in step 309; and (2) employing a statistical or sampling algorithm to select transactions and associated transaction data fields for auditing and verifying calculation in step 308 (performed by Rules Processor 104—see FIG. 1) where such tax calculations were performed by a Certified tax Calculation Application, while still creating audited transaction data field information in step 309.

After the audit and verify process of step 308 (performed by Rules Processor 104—see FIG. 1) has been completed with respect to transaction data fields associated with the transaction, audited transaction data fields are created in step 309 (performed by Rules Processor 104—see FIG. 1). The audited transaction data fields comprise the data contained in the transaction data fields as well as such data to indicate the audit and verify process has been completed, including the types of tax or taxes the transaction data fields were tested for, the results of such tests, variances, if any between the tax liability as provided in the transaction data fields, and tax liabilities, as re-calculated in the audit and verify process.

The audited transaction data field information created in 309 are appended to, or merged into: (1) the transaction data fields maintained by the credit card company and/or merchant seller (in step 310); and (2) the transaction data fields maintained within the present invention (in step 312). Steps 310 and 312 are performed by Rules Processor 104 (see FIG. 1).

In step 314 (performed by Aggregation Server 105—see FIG. 1), the audited tax transaction data fields and any associated Data are transferred to the Database 106 (see FIG. 1) and this portion of the process ends in step 316. While not required for operation of the present Invention, the credit card company and/or merchant appends or merges audited transaction data fields in step 310 to the associated with the data stream/database 311. For an embodiment in which the merchant seller is a legal agent for the collection of tax from the buyer and also for payment of such tax to the appropriate tax imposing jurisdiction(s), step 313 (a "credit" step) makes entries (i.e., "credits") in the accounts of the appropriate tax imposing jurisdictions, thus increasing the balance of the account of the appropriate tax imposing jurisdictions by the amount of the tax liability in the audited transaction data fields. A corresponding "counter entry" (i.e., "debit") is made to the account of the merchant seller in step 315 (a "debit" step) (performed by Aggregation Server 105—see FIG. 1), thus decreasing the balance of the account by the amount of the tax liability that will be transferred to the appropriate tax imposing jurisdictions. After step 315, the process ends in step 317.

An alternative implementation to eliminate step 305 and reduce step 310 is to retain the copy of the transaction data field information generated in step 303 (for subsequent use in step 310) until a unique tax transaction ID is assigned in step 304 and the audit and verify process step 308 has been completed. The results of step 308 is then combined into the audited transaction data field information of step 309 and is next appended or merged by the credit card company and/or merchant in step 310 (performed by Intercept Processor 101 and/or Aggregation Server 105—see FIG. 1). Since the copy of the transaction data field information of step 303 has been updated to provide for appending the unique tax transaction ID of step 304 and completing the audit and verify process of step 308, the append step 312 is no longer necessary and the audited transaction data Fields are transferred in step 314 to Database 106 (see FIG. 1), and this portion of the process ends in step 316.

In an alternative embodiment relating to FIG. 3 in which the buyer finances the transaction through a charge to the buyer's credit card, there is no legal agent to the transaction for the collection and payment of the tax due to the tax imposing jurisdiction, and the merchant seller has no legal obligation to report the transaction to a tax imposing jurisdiction that is legally permitted to collect a tax on the transaction. As an example, the transaction may occur over the Internet such that the buyer is legally obligated to pay a use tax to a tax imposing jurisdiction, but the merchant seller is not required to report the transaction to the tax imposing jurisdiction. The process of FIG. 3 applies to this alternative embodiment, with the exception that the credit and debit steps 313 and 315, respectively, are not performed. Nonetheless, all of the transaction data fields have been recorded in the Database 106 in step 314. Since the tax imposing jurisdictions may periodically query the Database 106 via any of the software mechanisms 202, 203, 204, and/or 205 of FIG. 2 as described supra, this alternative embodiment of the present invention offers tax imposing jurisdictions practical mechanisms for tax collection for situations in which no practical tax collection mechanism existed previously in the related art.

In an alternative embodiment relating to FIG. 3 in which the buyer finances the transaction through a charge to the buyer's credit card, the credit card company (or other EPN or EN) is the legal agent to the transaction for the collection and payment of the tax due to the tax imposing jurisdiction. The process of FIG. 3 applies to this alternative embodiment, with the exception that the debit step 315 is modified as follows. In step 315, the corresponding "counter entry" (i.e., "debit") is made to the account of the credit card company instead of to the merchant seller, since in this embodiment the credit card company, rather than the merchant seller, is the legal agent to the transaction for the collection and payment of the tax due to the tax imposing jurisdiction.

In an alternative embodiment relating to FIG. 3 in which the buyer finances the transaction through a charge to the buyer's credit card, the Clearinghouse 107 (see FIG. 1) is the legal agent to the transaction for the collection and payment of the tax due to the tax imposing jurisdiction. At the time when authorization for the transaction between the buyer and merchant seller occurs, the financing network (e.g., the credit card company) credits the account of the Clearinghouse 107 for the amount of tax due to the tax imposing jurisdiction. Otherwise, the process of FIG. 3 applies to this alternative embodiment, with the exception that the debit step 315 is modified as follows. In step 315, the corresponding "counter entry" (i.e., "debit") is made to the account of the Clearinghouse 107 instead of to the merchant seller, since in this embodiment the Clearinghouse 107, rather than the merchant seller, is the legal agent to the transaction for the collection and payment of the tax due to the tax imposing jurisdiction.

In an alternative embodiment relating to FIG. 3 in which the buyer finances the transaction through a charge to the buyer's credit card, there is no legal agent to the transaction for the collection of the tax due to the tax imposing jurisdiction, and the tax imposing jurisdiction is legally entitled to receive the tax from the financing network (e.g., the credit card company) when authorization for payment of the transaction by the financing network occurs, at which time the credit financing network pays the amount of tax due to the tax imposing jurisdiction. Otherwise, the process of FIG. 3 applies to this alternative embodiment, with the exception that the credit and debit steps 313 and 315, respectively, are not performed.

In summary in relation to the process of FIG. 3 in which the buyer finances the transaction through a charge to the buyer's credit card, the present invention provides the aforementioned five embodiments revolving around agency relationships and the performance or non-performance of associated credit and debit steps 313 and 315, respectively. In the first such embodiment, the seller is the legal agent to the transaction for the collection and payment of the tax due to the tax imposing jurisdiction. In the second such embodiment, there is no legal agent to the transaction for the collection and payment of the tax due to the tax imposing jurisdiction. In the third such embodiment, the credit card company is the legal agent to the transaction for the collection and payment of the tax due to the tax imposing jurisdiction. In the fourth such embodiment, the Clearinghouse 107 (see FIG. 1) is the legal agent to the transaction for the collection and payment of the tax due to the tax imposing jurisdiction. In the fifth such embodiment, there is no legal agent to the transaction for the collection and payment of the tax due to the tax imposing jurisdiction, and the tax imposing jurisdiction is legally entitled to receive the tax from the financing network (i.e., the electronic network or the electronic payment network) at the time of occurrence of the transaction.

If at least two of the aforementioned five embodiments may potentially prevail in a transaction in an implementation of the present invention, then the transaction data field may include an indication of which of the preceding five embodiments applies (and supporting data required for the implementation, if any) for each tax imposing jurisdiction involved in the transaction.

Examples of at least two of the aforementioned five embodiments prevailing in a transaction are as follows, wherein the transaction comprises a first TIJ and a second TIJ such that the first and second TIJs are different TIJs.

In a first example, there is a first legal agent to the transaction for collection and payment of the tax due to the first TIJ and there is no legal agent to the transaction for collection and payment of the tax due to the second TIJ.

In a first special case of the first example, the first legal agent is the seller, the financing network, or the Clearinghouse 107 (see FIG. 1).

In a second special case of the first example, the second TIJ is legally entitled to receive its tax due at the time of occurrence of said authorization.

In a second example, there is a first legal agent to the transaction for collection and payment of the tax due to the first TIJ and there is a second agent to the transaction for collection and payment of the tax due to the second TIJ, wherein the first and second agents are different agents each selected from the group consisting of the seller, the financing network, and the Clearinghouse 107 (see FIG. 1).

Since the buyer engages in only a single credit card transaction regardless of which of the aforementioned five embodiments applies, the implementation details pertaining to the relevant embodiments of the aforementioned five embodiments is essentially or substantially transparent to the buyer, which is a major convenience for the buyer.

The following example illustrates the aforementioned five embodiments of FIG. 3. This example illustrates a transaction in which a buyer, who could also be referred to as the taxpayer, is making a purchase from a merchant seller for $100.00 and decides to settle the transaction by paying with a credit card.

In the first embodiment of the aforementioned five embodiments for this example, the merchant seller operates an Internet web site and is located in a same tax imposing jurisdiction as the taxpayer buyer. The seller has "nexus", which is the condition of the merchant seller having sufficient presence in a tax imposing jurisdiction relating to the buyer, to be subject to specific laws of that tax imposing jurisdiction with respect to the collection of tax as a tax agent on behalf of such tax imposing jurisdiction.

The merchant seller collects information from the taxpayer buyer including all transaction data fields necessary for the calculation of sales tax, which, in this case, amounts to a total of $8.00 based upon a tax rate of 8%, a rate which combines a 4% rate of tax assessed by the county the buyer is located in, and an additional 4% rate assessed by the state the buyer is located in. The merchant seller completes the calculation of tax via a computer program located on the seller's computer or point of sale device, calculates a total amount due from the buyer ($108.00), comprised of the original amount of the purchase plus associated sales tax, and forwards the details of the transaction and associated transaction data fields to the buyer's credit card company. The merchant seller accepts the buyer's credit card through a "Card Not Present Merchant Account," which is a merchant account required to be maintained by the buyer, who is also referred to as the "merchant", when doing business over the Internet.

The credit card company receives the information related to the transaction, including the associated transaction data fields, and begins the authorization process with respect to the buyer's credit card. In step 302, the present invention recognizes transaction data fields from the data stream/database 301 of the credit card company, and concludes (in step 334) that the transaction has already been authorized. Thus a copy of the transaction data fields are made in step 303, a unique tax transaction ID is assigned in step 304, and appended to the copy 303 of the transaction data fields in step 307, as well as being appended to the original transaction data fields 306 in step 305.

In step 308, the transaction data fields are audited and verified and determined to be accurate. In step 309, the audited transaction data field information is created, indicating accurate tax calculations and a tax liability of $4.00 payable to one tax imposing jurisdiction, namely the county where the buyer and seller are located, as well as $4.00 payable to another tax imposing jurisdiction, namely the state where the buyer and merchant seller are located.

In step 311, these audited transaction data fields are appended or merged with the data stream or database containing the original transaction data fields. In step 313, an entry is made in the account of the county to record an amount payable directly to such county for $4.00, and an entry is made in the account of the state to record an amount payable directly to such state for $4.00. In step 315, an entry is made in the account of the merchant seller, recording a total liability of $8.00. In step 312, the audited transaction data fields are appended or merged with the transaction data fields copy and transferred in step 314 to Database 106 (see FIG. 1) where such Data may be further accessed by the respective state and county tax authorities via any of mechanisms 202-205 of FIG. 2. The tax liabilities in this example will be paid to the state and local tax authorities, or made available to them in their Clearinghouse 107 (see FIG. 1) account, as soon as the credit card capture transaction occurs.

In the second embodiment of the aforementioned five embodiments for this example, if the merchant seller has no physical location or place of business in the state of the buyer, the seller may not have nexus, and therefore is not responsible (under existing tax law) for the collection of tax from the buyer with respect to the tax imposing jurisdiction of the buyer. Assuming all other facts associated with the transaction remaining the same, the merchant seller calculates the total amount to be charged to the credit card ($100.00).

When the transaction data fields are audited and verified in step 308 (performed by Rules Server 104—see FIG. 1) a determination is made (by Aggregation Server 105—see FIG. 1) that while the merchant seller is not responsible for the collection of taxes based upon current law, the buyer is nonetheless responsible for a use tax payable to tax imposing jurisdictions. Audited transaction data field information is created in step 309 and transferred back to the credit card company in step 310 (performed by Intercept Processor 101—see FIG. 1), and also in step 314 to the Database 106 (see FIG. 1) (performed by Aggregation Server 105—see FIG. 1) where it is available for further analysis and further processing by such state and county tax authorities via any of mechanisms 202-205 of FIG. 2.

The tax imposing jurisdiction could charge the credit card of the buyer for $4.00 of use tax. The tax imposing jurisdiction (in this case a state tax authority) could also charge the additional $4.00 on behalf of the county if the state had an agency relationship with such county tax authority. However, since the tax has been identified as relating to such county, and the county has access to funds with the credit card company directly (via step 313) or through the Clearinghouse 107 (see FIG. 1) functionality, the county tax authority may want to take direct responsibility for management of its own tax affairs by accessing the Database 106 (see FIG. 1) via a number of different alternatives, such as employing a software product or service application 204 (see FIG. 2). The tax imposing jurisdiction could also access the Clearinghouse 107 (see FIG. 1) through a Custom or Product/Service Application 205 (see FIG. 2).

By accessing the Database 106 (see FIG. 1) and/or the Clearinghouse 107 (see FIG. 1) in this way, the state tax authority could choose from a variety of different processing options, including, but not limited to, sending a notice to the buyer, or request the credit card company to include such notice in its next credit card account statement mailed to the buyer, accumulating such use tax liabilities based upon state defined business rules and notifying the taxpayer when the amounts exceed a pre-determined threshold, with amounts below that threshold amount automatically treated as a tax liability that is automatically added to the appropriate state income tax return at year end. The state tax authority might also consider automatically charging a service fee, to defray the cost of individually collecting use tax.

In the third embodiment of the aforementioned five embodiments for this example, the credit card company is the legal agent to the transaction for the collection and payment of the tax due to the tax imposing jurisdiction. The process of FIG. 3 applies to this third embodiment as compared with the first embodiment, with the exception that the debit step 315 is modified as follows. In step 315, the corresponding "counter entry" (i.e., "debit") of $8.00 is made to the account of the credit card company instead of to the merchant seller, since in this embodiment the credit card company, rather than the merchant seller, is the legal agent to the transaction for the collection and payment of the tax due to the tax imposing jurisdiction.

In the fourth embodiment of the aforementioned five embodiments for this example, the Clearinghouse 107 (see FIG. 1) is the legal agent to the transaction for the collection and payment of the tax due to the tax imposing jurisdiction. At the time when the transaction between the buyer and merchant seller occurs, the credit card company credits $8.00 to the account of the Clearinghouse 107 for the amount of tax due to the tax imposing jurisdiction. Otherwise, the process of FIG. 3 applies to this fourth embodiment as compared with the first embodiment, with the exception that the debit step 315 is modified as follows. In step 315, the corresponding "counter entry" (i.e., "debit") of $8.00 is made to the account of the Clearinghouse 107 instead of to the merchant seller, since in this embodiment the Clearinghouse 107, rather than the merchant seller, is the legal agent to the transaction for the collection and payment of the tax due to the tax imposing jurisdiction.

In the fifth embodiment of the aforementioned five embodiments for this example, there is no legal agent to the transaction for the collection of the $8.00 tax due to the tax imposing jurisdiction, and the tax imposing jurisdiction is legally entitled to receive the tax $8.00 at the time of occurrence of the transaction. At the time when the transaction between the buyer and merchant seller occurs, the credit card company pays the amount of tax due ($8.00) to the tax imposing jurisdiction. Otherwise, the process of FIG. 3 applies to this alternative embodiment, with the exception that the credit and debit steps 313 and 315, respectively, are not performed.

An alternative embodiment of the present invention is the processing of a credit transaction through a credit card relating to returned merchandise seeking credit, or a voided transaction. In such a case the steps outlined in FIG. 3 are all performed, with the exception that all dollar amounts are computed as credits, or negative amounts.

In an alternative embodiment of the present invention in FIG. 3, the credit card company determines that it does not want to implement steps required to enable the present invention to connect to the credit card company's data stream/database 301 for the purpose of assigning a transaction ID in step 304 and conducting audit and verify procedures in step 308. Instead, the credit card company determines it will simply identify tax liabilities relating to transactions, making an entry in the account of the tax imposing jurisdiction 313 and simultaneously making a corresponding counter entry 315 in the account of the merchant seller, followed by providing related transaction data fields available to parties including the appropriate tax imposing jurisdictions.

Figure 4:
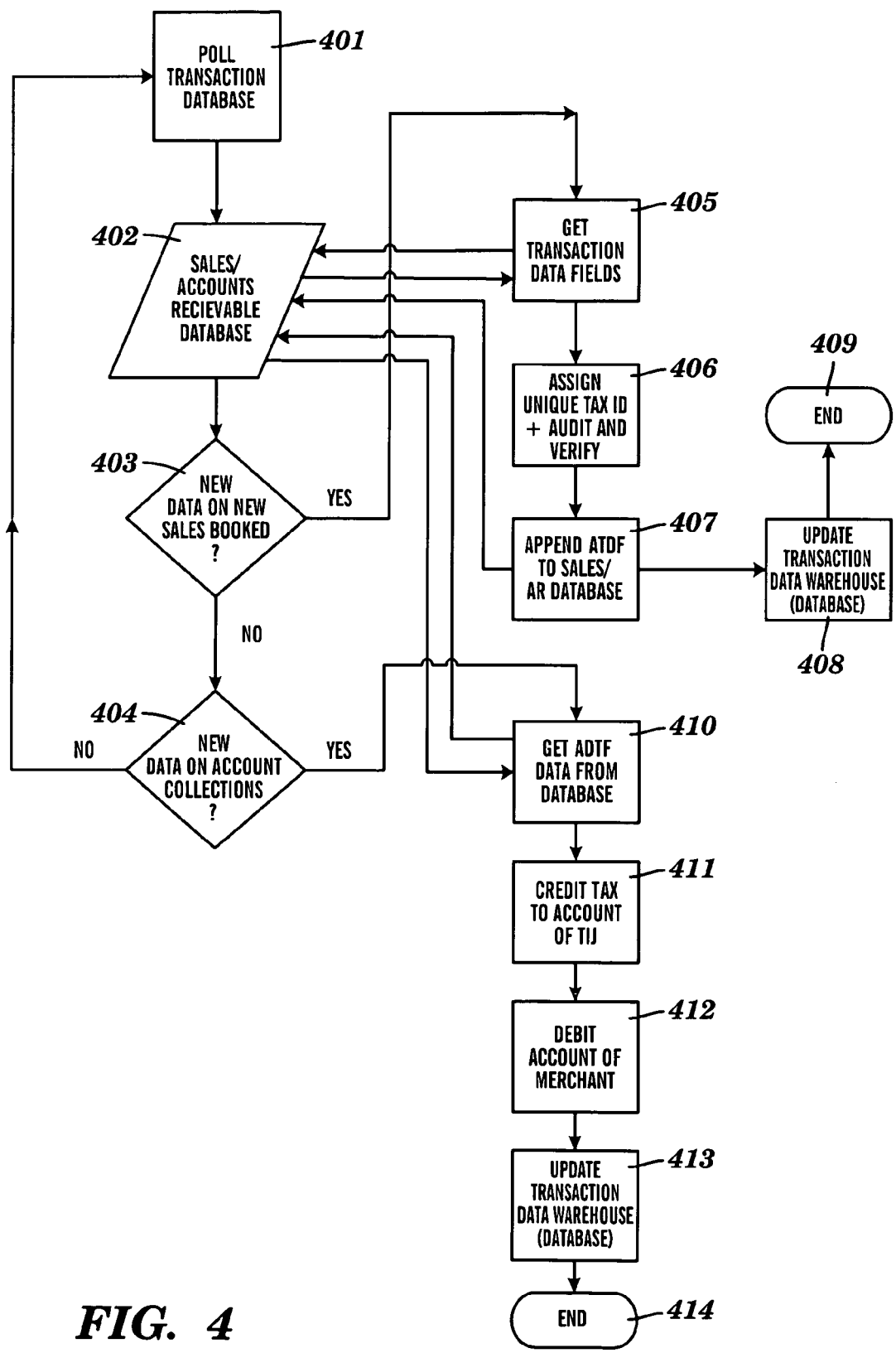
FIG. 4 is a flowchart depicting a processing of tax aspects of a sale of goods and/or services from a seller to a buyer in conjunction with the Network System of FIGS. 1 and 2, in accordance with alternative embodiments of the present invention.

FIG. 4 is a flowchart depicting a processing of tax aspects of a sale of goods and/or services from a seller to a buyer in conjunction with the Network System of FIGS. 1 and 2, in accordance with alternative embodiments of the present invention. FIG. 4 relates to situations in which the Electronic Payment Network and/or Electronic Network does not rely on the credit card authorization and capture process, or a similar process to initiate the payment for goods or services rendered.

In contrast with FIG. 4, the authorization and capture process of FIG. 3 is fundamentally designed to extend immediate credit to a buyer for immediate, or near immediate, payment of liabilities incurred for the purchase of goods and services. In such case of FIG. 3, the credit risk associated with the payment for goods and services has been eliminated by the seller, and, instead, replaced by a credit risk borne by the credit card company extending credit to the buyer of goods and/or services for near immediate payment to the merchant seller. Absent the authorization and capture process, Electronic Payment Networks and Electronic Networks generally bear the credit risk associated with the sale of goods and services, requiring a different implementation of the present invention. The credit card authorization and capture from a merchant seller's perspective, generally signals payment for goods and/or services rendered.

In the embodiments of FIG. 4, the same seller makes a sale and does not collect immediate payment via cash, check, or credit card, and the seller is extending credit to the buyer through the creation of a balance due, or account receivable from the buyer. In such cases, the Intercept Processor 101 (see FIG. 1) communicates with a Tax Liability Processor 103 (see FIG. 1) to collect transaction data fields. Tax Liability Processor 103 (see FIG. 1) is designed to systematically recognize sales made, and payments are received by buyers relating to amounts outstanding from sellers accounts. When payment for the transaction has been received from the buyer, the transaction is classified as a "paid-up" transaction. First the transaction database 402 relating to sales and amounts due, accounts receivable, etc., is polled in step 401 (performed by Intercept Processor 101—see FIG. 1) for information relevant to executing subsequent steps 403 and 404.

Step 403 determines if there is any transaction(s) associated new sales booked. If the answer in step 403 is "Yes", then a sequence of steps 405-409 is next executed. If the answer in step 403 is "No", then step 404 (performed by Intercept Processor 101—see FIG. 1) determines if there are any new data relating to the collection of amounts due on pending transactions. A "pending" transaction is a transaction that has previously been initiated, but payment by the buyer for the transaction has not yet been detected in step 404. When payment for the transaction has been detected in step 404, the transaction is classified as a "paid-up" transaction. If the answer in step 404 is "Yes", then a sequence of steps 410-413 is next executed. If the answer in step 404 is "No", then the process loops back to the polling step 401. Thus the process of FIG. 4 executes the sequence of steps 405-409 when new data on sales books is detected, and the sequence of steps 410-413 when new data relating to the collection of amounts due on previous transactions is detected. In alternative embodiments, the polling step 401 is not a separate step, but is instead performed within step 403 and within step 404.

In the execution of steps 405-409 (new data on sales books is detected), step 405 obtains transaction data fields associated with new transactions from the transaction database 402 (performed by Intercept Processor 101—see FIG. 1). Step 406 assigns a unique tax transaction ID to the transaction (performed by Intercept Processor 101—see FIG. 1), appends the unique tax transaction ID to the transaction data fields, and also performs audit and verify on the transaction data fields in a manner that is essentially or substantially the same as the audit and verify step 308 of FIG. 3 (performed by Rules Processor 104—see FIG. 1). After step 406, such data are considered audited transaction data fields (ATDF), which are next appended or merged in step 407 (performed by Aggregation Server 105—see FIG. 1). Step 408 updates the Database 106 (performed by Aggregation Server 105—see FIG. 1) to include the audited transaction data fields. The process ends in step 409, or alternatively the process returns to the loop of steps 401, 403, and 404 (not shown) to resume the polling of the transaction database 402.

In the execution of steps 410-413 (new data relating to the collection of amounts due on previous pending transactions is detected so that the transaction has become a paid-up transaction), step 410 obtains audited transaction data fields associated with the transaction from the transaction database 402 (performed by Intercept Processor 101—see FIG. 1). Step 411 makes an entry to credit the account of the appropriate tax imposing jurisdictions (performed by Aggregation Server 105—see FIG. 1) to whom the tax is payable to, and the associated funds are transferred to the Clearinghouse 7 (see FIG. 1) relating to such tax liabilities (performed by Aggregation Server 105—see FIG. 1). Step 412 debits the account of the merchant seller by the amount of such tax liabilities. In step 413, Database 106 (see FIG. 1) is updated to reflect the receipt of payment, and the associated audited transaction data fields are updated accordingly. The process ends in step 414, or alternatively the process returns to the loop of steps 401, 403, and 404 (not shown) to resume the polling of the transaction database 402.

The following example further illustrates embodiments of FIG. 4. This example illustrates a transaction in which a buyer, who could also be referred to as the taxpayer, is making a purchase from a merchant seller for $100.00 and decides to settle the transaction by requesting the merchant seller to extend credit, providing the buyer with 30 days to pay for his purchase. The merchant seller is located in the same jurisdiction as the buyer. The merchant seller has "nexus", which is the condition of the seller having sufficient presence in a tax imposing jurisdiction with respect to the collection of tax as a tax agent on behalf of such tax imposing jurisdiction.

The merchant seller collects information from the taxpayer buyer including all transaction data fields necessary for the calculation of sales tax, which, in this case, amounts to a total of $8.00 based upon a tax rate of 8%, a rate which combines a 4% rate of tax assessed by the county the buyer is located in, and an additional 4% rate assessed by the state the buyer is located in.

The merchant seller completes the calculation of tax by submitting appropriate transaction data fields to the Electronic Network Tax Liability Processor 103 (see FIG. 1) for calculation of tax. In the present example, the Tax Liability Processor 103 is provided by a GST whose programs have been certified as accurate and therefore requiring no further recalculation. The Tax Liability Processor 103 calculates the tax liability of $8.00 which is then combined with the amount of the purchase ($100.00) to determine the total amount due from the buyer ($108.00), comprised of the original amount of the purchase plus associated sales tax, and forwards the details of the transaction and associated transaction data fields to the merchant seller's accounting department to record the sale as an account receivable. Such amount could also be entered into the transaction database 402 of the merchant seller directly through the seller's point of sale or other similar software program.

For this example, the iterative looping though steps 401, 403, and 404 proceeds (with possible transient departures from this loop when new data on new sales booked is detected in step 403) until collection of the tax ($8.00) is detected in step 404, which triggers execution of the steps 410-413. Step 411 credits the amount of tax ($8.00) to the account of the tax imposing jurisdiction, step 412 debits the account of the merchant seller by the amount ($8.00) of the tax liability, and step 413 updates the Database 106 (see FIG. 1).

An alternative embodiment is to credit the account of the appropriate tax imposing jurisdictions in step 411 for tax liabilities based upon the tax laws of the tax imposing jurisdiction, and make a counter entry in the account of the merchant seller, (e.g., at step 403) regardless of whether funds were collected by the merchant seller.

An alternative embodiment is to credit the account of the appropriate tax imposing jurisdictions in step 411 and also to transfer funds from the merchant seller to the Financial/Treasury/Data Services Clearinghouse 107 (see FIG. 1) (e.g., at step 403). This could be performed by Intercept Processor 101. (see FIG. 1) or Aggregation Server 105 (see FIG. 1).

An alternative embodiment of the present invention, in application to both FIG. 3 and FIG. 4, is to skip, or override, the functions provided by Aggregation Server 105 (see FIG. 1) and enable the processes performed by the Intercept Processor 101 (see FIG. 1) and Rules Processor 104 (see FIG. 1) to poll the Database 106 (see FIG. 1) directly and merge or append updates to such data directly, possibly by accessing metadata relating to the Database 106 (see FIG. 1).

As some other examples of the present invention, which examples are by no way an exhaustive list of applications, if a national sales tax was implemented, the infrastructure employed by the system of the present invention could facilitate the distribution of collected revenues to an appropriate revenue agency.

Further, issues of distributing a tax collected at only one point to different entities will arise constantly. Many state sales taxes are, in fact, a bundled charge combining different tax imposing jurisdictions such as a county rate along with a state rate of tax. Also, in the formation of the European Union, a tax may only be collected at a final point of sale, but such a tax may be required to be distributed among different revenue agencies, which can encompass different countries. In this instance, the system of the present invention is specifically designed to be effective in ensuring the efficient and appropriate break out and routing of such collected tax revenues.

The mechanisms and processes set forth in the present description may be implemented using a conventional and general purpose microprocessor programmed according to the teachings of the present invention, as appreciated by those skilled in the relevant art or arts. Appropriate software coding can readily be prepared by skilled programmers based on the teachings of the present disclosure, as will also be apparent by those skilled in the relevant art or arts.

Figure 5:
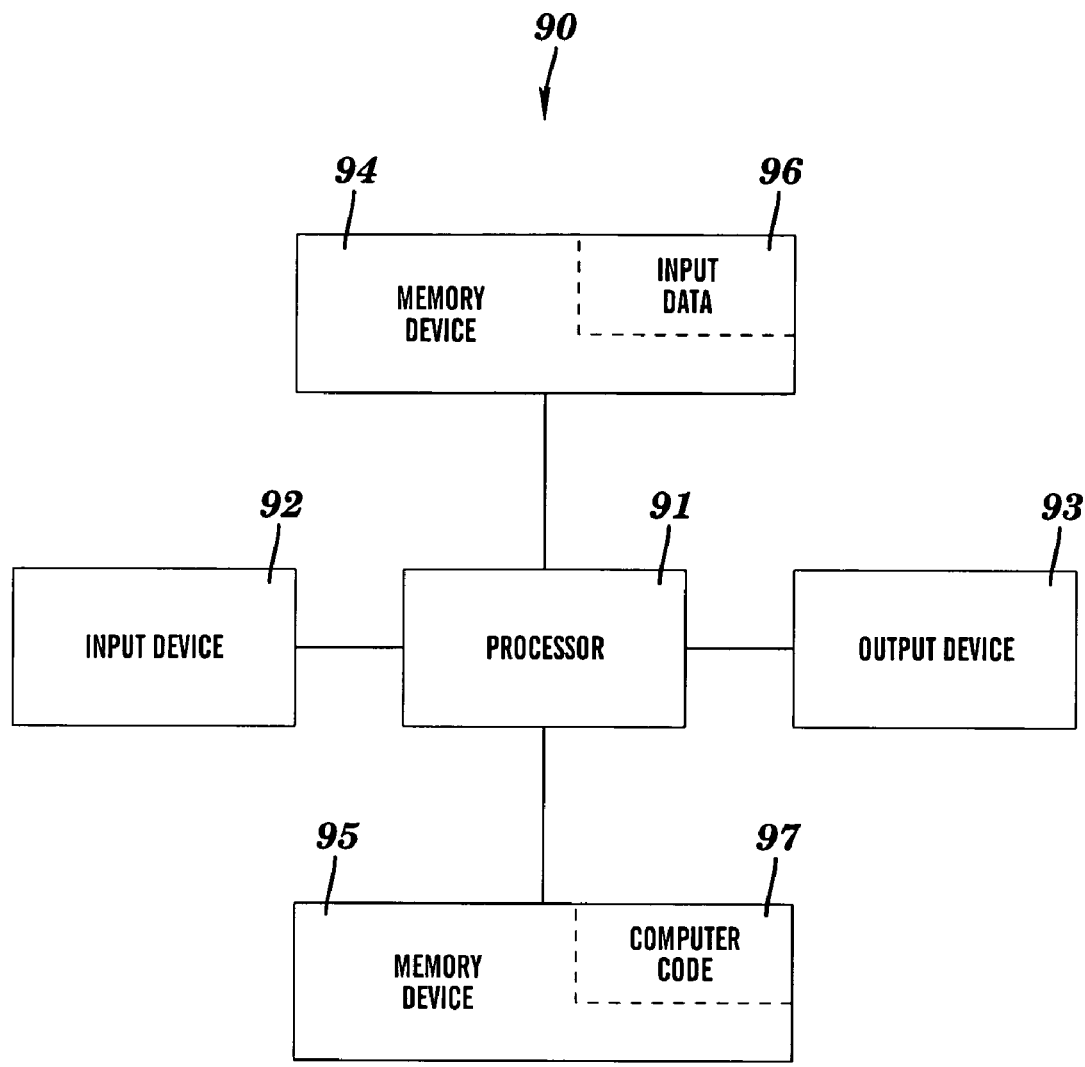
FIG. 5 illustrates a computer system used for implementing any software functionality that is within the scope of the present invention.

FIG. 5 illustrates a computer system 90 used for implementing any software functionality described herein (e.g., the software functionality performed by the Intercept Processor of FIG. 1), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms for implementing any software functionality described herein. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

The present invention thus includes a computer-based product which may be hosted on a storage medium and include instructions which can be used to program a computer to perform a process in accordance with the present invention. This storage medium can include, but is not limited to, any type of disk including floppy disk, optical disk, CD-ROMS, magneto-optical disks, ROMS, RAMS, EPROMS, EEPROMS, flash memory, magnetic or optical cards, or any type of media suitable for storing electronic instructions.

Obviously, numerous additional modifications and variations of the present invention are possible in light of the above teachings. It is therefore to be understood that within the scope of the appended claims the present invention may be practiced otherwise than as specifically described herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing tax pertaining to a goods and services transaction between a seller and a buyer, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction having been authorized to be financed for the tax due to each TIJ by a financing network comprising an electronic network or an electronic payment network, said method comprising in real time:

receiving first transaction data fields that include data pertaining to the transaction, said data including an initial indication of the tax due to each TIJ, said data being sufficient for determining the tax due to each TIJ;

generating second transaction data fields as a copy of the received first transaction data fields;

assigning a unique tax transaction identification pertaining to taxation of the transaction; and a processor of a computer system appending the assigned tax transaction identification to the second transaction data fields, resulting in the second transaction data fields including the assigned unique tax transaction identification.

2. The method of claim 1, wherein the financing network is a credit card company.

3. The method of claim 1, wherein said receiving first transaction data fields comprises receiving the first transaction data fields from a data source comprising a data stream transmitted by the financing network or a database of the financing network.

4. The method of claim 3, said method further comprising appending the assigned unique tax transaction identification to the first transaction data fields within the data source.

5. The method of claim 3, wherein the data source is the data stream transmitted by the financing network, wherein the seller is a first seller and the buyer is a first buyer, wherein the first transaction data fields further include data pertaining to a different transaction, and wherein the different transaction is a goods and services transaction between a second seller and a second buyer.

6. The method of claim 5, wherein the first and second sellers are different sellers.

7. The method of claim 5, wherein the first and second buyers are different buyers.

8. The method of claim 1, wherein the seller is a legal agent to the transaction for collection and payment of the tax due to a first TIJ of the at least one TIJ.

9. The method of claim 1, wherein the financing network is a legal agent to the transaction for collection and payment of the tax due to a first TIJ of the at least one TIJ.

10. The method of claim 1, wherein a clearinghouse is a legal agent to the transaction for collection and payment of the tax due to a first TIJ of the at least one TIJ, wherein the clearinghouse is adapted to make transaction data stored in a transaction data warehouse available to the at least one TIJ.

11. The method of claim 1, wherein there is no legal agent to the transaction for collection and payment of the tax due to a first TIJ of the at least one TIJ.

12. The method of claim 11, wherein the first TIJ was legally entitled to receive its tax due when the transaction was authorized to be financed for the tax due to the first TIJ by the financing network.

13. The method of claim 1, wherein the at least one TIJ comprises a first TIJ and a second TIJ, and wherein the first and second TIJs are different TIJs.

14. The method of claim 13, wherein there is a first legal agent to the transaction for collection and payment of the tax due to the first TIJ, and wherein there is no legal agent to the transaction for collection and payment of the tax due to the second TIJ.

15. The method of claim 14, wherein the first legal agent is the seller, the financing network, or a clearinghouse, and wherein the clearinghouse is adapted to make transaction data stored in a transaction data warehouse available to the at least one TIJ.

16. The method of claim 14, wherein the second TIJ was legally entitled to receive its tax due when the transaction was authorized to be financed for the tax due to the second TIJ by the financing network.

17. The method of claim 13, wherein there is a first legal agent to the transaction for collection and payment of the tax due to the first TIJ, wherein there is a second agent to the transaction for collection and payment of the tax due to the second TIJ, and wherein the first and second agents are different agents each selected from the group consisting of the seller, the financing network, and a clearinghouse, wherein the clearinghouse is adapted to make transaction data stored in a transaction data warehouse available to the at least one TIJ.

18. The method of claim 1, said method further comprising in said real time:

responsive to said appending, performing an audit and verify process on the second transaction data fields to determine an extent to which the initial indication of the tax due to each TIJ is accurate, and merging results of the audit and verify process into the second transaction data fields, said results including a verified tax due to each TIJ.

19. The method of claim 18, said method further comprising in said real time:

after said merging, transferring the second transaction data fields to a transaction data warehouse, wherein a clearinghouse is adapted to make transaction data stored in the transaction data warehouse available to the at least one TIJ.

20. The method of claim 18, wherein said performing the audit and verify process comprises:

determining that the initial indication of the tax due to the first TIJ was not certified as having been calculated by a software application whose accuracy for calculating the initial indication of the tax due to the first TIJ has been certified by at least one independent party that is recognized by the first TIJ for said calculating; and responsive to said determining that the initial indication of the tax due to the first TIJ was not certified:

computing the tax due to a first TIJ of the at least one TIJ as the verified tax due to the first TIJ, based on tax laws of the first TIJ applied to the second transaction data fields; and ascertaining that the computed tax due to the first TIJ is equal to the initial indication of the tax due to the first TIJ.

21. The method of claim 18, wherein said performing the audit and verify process comprises:

determining that the initial indication of the tax due to the first TIJ was certified as having been calculated by a software application whose accuracy for calculating the initial indication of the tax due to the first TIJ has been certified by at least one independent party that is recognized by the first TIJ for said calculating.

22. The method of claim 21, wherein said performing the audit and verify process comprises:

responsive to said determining that the initial indication of the tax due to the first TIJ was certified, accepting said verified tax due to the first TIJ as being equal to the initial indication of the tax due to the first TIJ that had been calculated by the software application.

23. The method of claim 21, wherein said performing the audit and verify process comprises:
  responsive to said determining that the initial indication of the tax due to the first TIJ was certified, executing a statistical sampling algorithm to decide whether to compute the tax due to the first TIJ;
  if it is decided from executing the statistical sampling algorithm not to compute the tax due to the first TIJ, then not computing the tax due to each TIJ and accepting said verified tax due to the first TIJ as being equal to the first initial indication of the tax due to the first TIJ; and
  if it is decided from executing the statistical sampling algorithm to compute the tax due to the first TIJ, then:
    computing the tax due to a first TIJ of the at least one TIJ as the verified tax due to the first TIJ, based on tax laws of the first TIJ applied to the second transaction data fields; and
    ascertaining that the computed tax due to the first TIJ is equal to the initial indication of the tax due to the first TIJ.

24. The method of claim 18, wherein the results of the audit and verify process further comprise an indication that the audit and verify process has been completed.

25. The method of claim 24, wherein said method further comprises adding the results of the audit and verify process to the first transaction data fields within the data source.

26. The method of claim 18, said assigned unique tax transaction identification having been appended to the first transaction data fields within the data source, said audited and verified second transaction data fields comprising audited and verified information, said audited and verified information having been merged into the first transaction data fields within the data source, a legal agent to the transaction existing for collection and payment of the tax due a first TIJ of the at least one TIJ, said method further comprising in said real time:
  crediting an account of the first TIJ by the verified tax due to the first TIJ; and
  debiting an account of the legal agent by the verified tax due to the first TU.

27. The method of claim 26, wherein the seller is the legal agent to the transaction for the collection and payment of the tax due to each TIJ.

28. The method of claim 26, wherein the financing network is the legal agent to the transaction for the collection and payment of the tax due to the first TIJ.

29. The method of claim 26, said method further comprising in said real time:
  after said merging, transferring the second transaction data fields to a transaction data warehouse, wherein a clearinghouse is adapted to make transaction data stored in the transaction data warehouse available to the at least one TIJ, and wherein the clearinghouse is the legal agent to the transaction for the collection and payment of the tax due to the first TIJ.

30. The method of claim 26, wherein the transaction comprises a sale of merchandise by the seller to the buyer, wherein after said crediting and debiting the buyer has returned the merchandise to the seller after which the method further comprises in said real time:
  subtracting the verified tax due to the first TIJ from the account of the first TIJ; and
  adding the verified tax due to the first TIJ to the account of the legal agent.

31. The method of claim 26, wherein there is no legal agent to the transaction for the collection and payment of the tax due to a first TIJ of the at least one TIJ.

32. The method of claim 31, wherein the first TIJ is legally entitled to receive its tax due when the transaction was authorized to be financed for the tax due to the first TIJ by the financing network.

33. A computer program product, comprising a computer readable storage medium having a computer readable program code embodied therein, said computer readable program code comprising an algorithm adapted to implement a method for processing tax pertaining to a goods and services transaction between a seller and a buyer, said transaction having a transaction value payable by the buyer and receivable by the seller, said transaction triggering a tax due to at least one tax imposing jurisdiction (TIJ), said tax due to each TIJ being specific to each TIJ of the at least one TIJ, said buyer being liable for the tax due to each TIJ, said transaction having been authorized to be financed for the tax due to each TIJ by a financing network comprising an electronic network or an electronic payment network, said method comprising in real time:
  receiving first transaction data fields that include data pertaining to the transaction, said data including an initial indication of the tax due to each TIJ, said data being sufficient for determining the tax due to each TIJ;
  generating second transaction data fields as a copy of the received first transaction data fields;
  assigning unique a tax transaction identification pertaining to taxation of the transaction; and
  appending the assigned tax transaction identification to the second transaction data fields, resulting in the second transaction data fields including the assigned unique tax transaction identification.

34. The computer program product of claim 33, wherein the financing network is a credit card company.

35. The computer program product of claim 33, wherein said receiving first transaction data fields comprises receiving the first transaction data fields from a data source comprising a data stream transmitted by the financing network or a database of the financing network.

36. The computer program product of claim 35, said method further comprising appending the assigned unique tax transaction identification to the first transaction data fields within the data source.

37. The computer program product of claim 35, wherein the data source is the data stream transmitted by the financing network, wherein the seller is a first seller and the buyer is a first buyer, wherein the first transaction data fields further include data pertaining to a different transaction, and wherein the different transaction is a goods and services transaction between a second seller and a second buyer.

38. The computer program product of claim 37, wherein the first and second sellers are different sellers.

39. The computer program product of claim 37, wherein the first and second buyers are different buyers.

40. The computer program product of claim 33, wherein the seller is a legal agent to the transaction for collection and payment of the tax due to a first TIJ of the at least one TIJ.

41. The computer program product of claim 33, wherein the financing network is a legal agent to the transaction for collection and payment of the tax due to a first TIJ of the at least one TIJ.

42. The computer program product of claim 33, wherein a clearinghouse is a legal agent to the transaction for collection and payment of the tax due to a first TIJ of the at least one TIJ, wherein the clearinghouse is adapted to make transaction data stored in a transaction data warehouse available to the at least one TIJ.

43. The computer program product of claim 33, wherein there is no legal agent to the transaction for collection and payment of the tax due to a first TIJ of the at least one TIJ.

44. The computer program product of claim 43, wherein the first TIJ was legally entitled to receive its tax due when the transaction was authorized to be financed for the tax due to the first TIJ by the financing network.

45. The computer program product of claim 33, wherein the at least one TIJ comprises a first TIJ and a second TIJ, and wherein the first and second TIJs are different TIJs.

46. The computer program product of claim 45, wherein there is a first legal agent to the transaction for collection and payment of the tax due to the first TIJ, and wherein there is no legal agent to the transaction for collection and payment of the tax due to the second TIJ.

47. The computer program product of claim 46, wherein the first legal agent is the seller, the financing network, or a clearinghouse, and wherein the clearinghouse is adapted to make transaction data stored in a transaction data warehouse available to the at least one TIJ.

48. The computer program product of claim 46, wherein the second TIJ was legally entitled to receive its tax due when the transaction was authorized to be financed for the tax due to the second TIJ by the financing network.

49. The computer program product of claim 45, wherein there is a first legal agent to the transaction for collection and payment of the tax due to the first TIJ, wherein there is a second agent to the transaction for collection and payment of the tax due to the second TIJ, and wherein the first and second agents are different agents each selected from the group consisting of the seller, the financing network, and a clearinghouse, wherein the clearinghouse is adapted to make transaction data stored in a transaction data warehouse available to the at least one TIJ.

50. The computer program product of claim 33, said method further comprising in said real time:
responsive to said appending, performing an audit and verify process on the second transaction data fields to determine an extent to which the initial indication of the tax due to each TIJ is accurate, and
merging results of the audit and verify process into the second transaction data fields, said results including a verified tax due to each TIJ.

51. The computer program product of claim 50, said method further comprising in said real time:
after said merging, transferring the second transaction data fields to a transaction data warehouse, wherein a clearinghouse is adapted to make transaction data stored in the transaction data warehouse available to the at least one TIJ.

52. The computer program product of claim 50, wherein said performing the audit and verify process comprises:
determining that the initial indication of the tax due to the first TIJ was not certified as having been calculated by a software application whose accuracy for calculating the initial indication of the tax due to the first TIJ has been certified by at least one independent party that is recognized by the first TIJ for said calculating; and
responsive to said determining that the initial indication of the tax due to the first TIJ was not certified:
computing the tax due to a first TIJ of the at least one TIJ as the verified tax due to the first TIJ, based on tax laws of the first TIJ applied to the second transaction data fields; and
ascertaining that the computed tax due to the first TIJ is equal to the initial indication of the tax due to the first TIJ.

53. The computer program product of claim 50, wherein said performing the audit and verify process comprises:
determining that the initial indication of the tax due to the first TIJ was certified as having been calculated by a software application whose accuracy for calculating the initial indication of the tax due to the first TIJ has been certified by at least one independent party that is recognized by the first TIJ for said calculating.

54. The computer program product of claim 53, wherein said performing the audit and verify process comprises:
responsive to said determining that the initial indication of the tax due to the first TIJ was certified, accepting said verified tax due to the first TIJ as being equal to the initial indication of the tax due to the first TIJ that had been calculated by the software application.

55. The computer program product of claim 53, wherein said performing the audit and verify process comprises:
responsive to said determining that the initial indication of the tax due to the first TIJ was certified, executing a statistical sampling algorithm to decide whether to compute the tax due to the first TIJ;
if it is decided from executing the statistical sampling algorithm not to compute the tax due to the first TIJ, then not computing the tax due to each TIJ and accepting said verified tax due to the first TIJ as being equal to the first initial indication of the tax due to the first TIJ; and
if it is decided from executing the statistical sampling algorithm to compute the tax due to the first TIJ, then:
computing the tax due to a first TIJ of the at least one TIJ as the verified tax due to the first TIJ, based on tax laws of the first TIJ applied to the second transaction data fields; and
ascertaining that the computed tax due to the first TIJ is equal to the initial indication of the tax due to the first TIJ.

56. The computer program product of claim 50, wherein the results of the audit and verify process further comprise an indication that the audit and verify process has been completed.

57. The computer program product of claim 56, wherein said method further comprises adding the results of the audit and verify process to the first transaction data fields within the data source.

58. The computer program product of claim 50, said assigned unique tax transaction identification having been appended to the first transaction data fields within the data source, said audited and verified second transaction data fields comprising audited and verified information, said audited and verified information having been merged into the first transaction data fields within the data source, a legal agent to the transaction existing for collection and payment of the tax due a first TIJ of the at least one TIJ, said method further comprising in said real time:
crediting an account of the first TIJ by the verified tax due to the first TIJ; and
debiting an account of the legal agent by the verified tax due to the first TIJ.

59. The computer program product of claim 58, wherein the seller is the legal agent to the transaction for the collection and payment of the tax due to each TIJ.

60. The computer program product of claim 58, wherein the financing network is the legal agent to the transaction for the collection and payment of the tax due to the first TIJ.

61. The computer program product of claim 58, said method further comprising in said real time:
after said merging, transferring the second transaction data fields to a transaction data warehouse, wherein a clearinghouse is adapted to make transaction data stored in the transaction data warehouse available to the at least one TIJ, and wherein the clearinghouse is the legal agent to the transaction for the collection and payment of the tax due to the first TIJ wherein a clearinghouse is the legal agent to the transaction for the collection and payment of the tax due to the first TIJ.

62. The computer program product of claim 58, wherein the transaction comprises a sale of merchandise by the seller to the buyer, wherein after said crediting and debiting the buyer has returned the merchandise to the seller after which the method further comprises in said real time:
   subtracting the verified tax due to the first TIJ from the account of the first TIJ; and
   adding the verified tax due to the first TIJ to the account of the legal agent.

63. The computer program product of claim 58, wherein there is no legal agent to the transaction for the collection and payment of the tax due to a first TIJ of the at least one TIJ.

64. The computer program product of claim 63, wherein the first TIJ is legally entitled to receive its tax due when the transaction was authorized to be financed for the tax due to the first TIJ by the financing network.

65. The method of claim 18, wherein said performing the audit and verify process comprises auditing the second transaction data fields.

66. The method of claim 18, wherein said performing the audit and verify process comprises verifying rates of tax and verifying business rules required for the application of the rates of tax to the second transaction data fields to determine if the type of tax, as well as the rates of tax, are appropriate for the transaction.

67. The computer program product of claim 50, wherein said performing the audit and verify process comprises auditing the second transaction data fields.

68. The computer program product of claim 50, wherein said performing the audit and verify process comprises verifying rates of tax and verifying business rules required for the application of the rates of tax to the second transaction data fields to determine if the type of tax, as well as the rates of tax, are appropriate for the transaction.

* * * * *